(12) United States Patent
Subramanya

(10) Patent No.: US 11,004,337 B2
(45) Date of Patent: *May 11, 2021

(54) ADVANCED PARKING MANAGEMENT SYSTEM

(71) Applicant: Balu Subramanya, Darnestown, MD (US)

(72) Inventor: Balu Subramanya, Darnestown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/144,161

(22) Filed: Dec. 30, 2013

(65) Prior Publication Data

US 2014/0218527 A1 Aug. 7, 2014

Related U.S. Application Data

(60) Provisional application No. 61/790,209, filed on Mar. 15, 2013, provisional application No. 61/746,842, filed on Dec. 28, 2012.

(51) Int. Cl.
*G08G 1/017* (2006.01)
*G07B 15/02* (2011.01)
*G08G 1/14* (2006.01)
*G01S 13/86* (2006.01)
*G01S 13/50* (2006.01)
(Continued)

(52) U.S. Cl.
CPC .............. *G08G 1/143* (2013.01); *G01S 13/04* (2013.01); *G01S 13/08* (2013.01); *G01S 13/50* (2013.01); *G01S 13/825* (2013.01); *G01S 13/867* (2013.01); *G01S 13/91* (2013.01); *G08G 1/0175* (2013.01); *G08G 1/142* (2013.01);
(Continued)

(58) Field of Classification Search
CPC ... G08G 1/143; B60C 23/001; G06Q 30/0284
USPC ......................................................... 348/148
See application file for complete search history.

(56) References Cited

U.S. PATENT DOCUMENTS 2,709,252 A 5/1955 Tasker
2,921,301 A 1/1960 Cartwright
(Continued)

FOREIGN PATENT DOCUMENTS

DE 199 49 737 4/2001
EP 0 347 090 A2 12/1989
(Continued)

OTHER PUBLICATIONS

US Parking Policies; Overview of Management Strategies, Institute for Transportation and Development Policy; Weinberger; 2010. (Year: 2010)*

(Continued)

*Primary Examiner* — Luis Perez-Fuentes
(74) *Attorney, Agent, or Firm* — Hunton Andrews Kurth LLP

(57) ABSTRACT

A parking management system that facilitates motorist guidance, payment, violation detection, and enforcement using highly accurate space occupancy detection, unique vehicle identification, guidance displays, payment acceptance, violation detection, enforcement data generation, electronic booting, and towing management is described. The system enables reduced time to find parking, congestion mitigation, accurate violation detection, and easier enforcement, and increased payment and enforcement revenues to cities.

26 Claims, 10 Drawing Sheets

(51) Int. Cl.
  *G01S 13/08*  (2006.01)
  *G01S 13/04*  (2006.01)
  *G01S 13/91*  (2006.01)
  *G01S 13/82*  (2006.01)

(52) U.S. Cl.
  CPC ............ *G08G 1/144* (2013.01); *G08G 1/146* (2013.01); *G08G 1/147* (2013.01); *G07B 15/02* (2013.01)

(56) References Cited

U.S. PATENT DOCUMENTS

| | | | |
|---|---|---|---|
| 3,126,540 A | 3/1964 | Nilssen | |
| 3,174,146 A | 3/1965 | Bossier et al. | |
| 3,182,312 A | 5/1965 | Daniels | |
| 3,241,106 A | 3/1966 | Du Vivier | |
| 3,582,620 A | 6/1971 | Noetinger | |
| 3,626,413 A | 12/1971 | Zachmann | |
| 3,838,421 A | 9/1974 | Dasse-Hartaut et al. | |
| 3,976,999 A | 8/1976 | Moore et al. | |
| 4,167,735 A | 9/1979 | Lewis | |
| 4,190,882 A | 2/1980 | Chevalier et al. | |
| 4,227,195 A | 10/1980 | Salerno et al. | |
| 4,620,192 A | 10/1986 | Collins | |
| 4,901,083 A | 2/1990 | May et al. | |
| 5,075,680 A | 12/1991 | Dabbs | |
| 5,189,425 A | 2/1993 | Dabbs | |
| 5,274,271 A | 12/1993 | McEwan | |
| 5,337,082 A | 8/1994 | Fredericks | |
| 5,345,471 A | 9/1994 | McEwan | |
| 5,361,070 A | 11/1994 | McEwan | |
| 5,374,932 A | 12/1994 | Wyschogrod et al. | |
| 5,422,607 A | 6/1995 | McEwan | |
| 5,457,394 A | 10/1995 | McEwan | |
| 5,461,384 A | 10/1995 | Sieprath et al. | |
| 5,465,094 A | 11/1995 | McEwan | |
| 5,471,162 A | 11/1995 | McEwan | |
| 5,479,120 A | 12/1995 | McEwan | |
| 5,497,100 A | 3/1996 | Reiser et al. | |
| 5,510,800 A | 4/1996 | McEwan | |
| 5,512,834 A | 4/1996 | McEwan | |
| 5,517,198 A | 5/1996 | McEwan | |
| 5,519,342 A | 5/1996 | McEwan | |
| 5,519,400 A | 5/1996 | McEwan | |
| 5,519,618 A | 5/1996 | Kastner et al. | |
| 5,521,600 A | 5/1996 | McEwan | |
| 5,523,760 A | 6/1996 | McEwan | |
| 5,563,605 A | 10/1996 | McEwan | |
| 5,573,012 A | 11/1996 | McEwan | |
| 5,576,627 A | 11/1996 | McEwan | |
| 5,581,256 A | 12/1996 | McEwan | |
| 5,589,838 A | 12/1996 | McEwan | |
| 5,609,059 A | 3/1997 | McEwan | |
| 5,661,490 A | 8/1997 | McEwan | |
| 5,682,164 A | 10/1997 | McEwan | |
| 5,686,921 A | 11/1997 | Okada et al. | |
| 5,754,144 A | 5/1998 | McEwan | |
| 5,757,320 A | 5/1998 | McEwan | |
| 5,764,189 A | 6/1998 | Lohninger | |
| 5,766,208 A | 6/1998 | McEwan | |
| 5,767,953 A | 6/1998 | McEwan | |
| 5,774,091 A | 6/1998 | McEwan | |
| 5,804,921 A | 9/1998 | McEwan et al. | |
| 5,805,110 A | 9/1998 | McEwan | |
| 5,883,591 A | 3/1999 | McEwan | |
| 5,966,090 A | 10/1999 | McEwan | |
| 5,986,600 A | 11/1999 | McEwan | |
| 6,031,421 A | 2/2000 | McEwan | |
| 6,031,504 A | 2/2000 | McEwan | |
| 6,055,287 A | 4/2000 | McEwan | |
| 6,060,915 A | 5/2000 | McEwan | |
| 6,072,427 A | 6/2000 | McEwan | |
| 6,137,438 A | 10/2000 | McEwan | |
| 6,191,724 B1 | 2/2001 | McEwan | |
| 6,266,005 B1 | 7/2001 | Schneider | |
| 6,278,965 B1 | 8/2001 | Glass et al. | |
| 6,317,076 B1 | 11/2001 | Ameen et al. | |
| 6,359,583 B1 | 3/2002 | Shamee | |
| 6,373,428 B1 | 4/2002 | McEwan | |
| 6,426,716 B1 | 4/2002 | McEwan | |
| 6,404,381 B1 | 6/2002 | Heide et al. | |
| 6,414,627 B1 | 7/2002 | McEwan | |
| 6,452,467 B1 | 9/2002 | McEwan | |
| 6,456,231 B1 | 9/2002 | McEwan | |
| 6,462,697 B1 | 10/2002 | Klamer et al. | |
| 6,462,705 B1 | 10/2002 | McEwan | |
| 6,466,168 B1 | 10/2002 | McEwan | |
| 6,486,825 B1 | 11/2002 | Smithey | |
| 6,492,933 B1 | 12/2002 | McEwan | |
| 6,531,977 B2 | 3/2003 | McEwan | |
| 6,535,161 B1 | 3/2003 | McEwan | |
| 6,600,103 B1 | 7/2003 | Schmidt et al. | |
| 6,642,854 B2 | 11/2003 | McMaster | |
| 6,644,114 B1 | 11/2003 | McEwan | |
| 6,662,099 B2 | 12/2003 | Knaian et al. | |
| 6,747,599 B2 | 6/2004 | McEwan | |
| 6,750,787 B2 | 6/2004 | Hutchinson | |
| 6,856,276 B2 | 2/2005 | Barrick et al. | |
| 6,873,250 B2 | 3/2005 | Viana et al. | |
| 6,888,494 B2 | 5/2005 | Tamatsu et al. | |
| 6,909,396 B2 | 6/2005 | Haselesteiner et al. | |
| 6,914,552 B1 | 7/2005 | McEwan | |
| 7,057,550 B1 | 6/2006 | Aker | |
| 7,068,210 B1 | 6/2006 | Mitra et al. | |
| 7,073,377 B2 * | 7/2006 | Lin ..................... | B60C 23/0483 73/146.8 |
| 7,084,807 B2 | 8/2006 | Steinbuch et al. | |
| 7,148,791 B2 | 12/2006 | Grisham et al. | |
| 7,180,428 B1 | 2/2007 | LeVan et al. | |
| 7,187,321 B2 | 3/2007 | Watanabe et al. | |
| 7,224,944 B2 | 5/2007 | McEwan | |
| 7,271,761 B2 | 9/2007 | Natsume et al. | |
| 7,345,623 B2 | 3/2008 | McEwan | |
| 7,359,782 B2 | 4/2008 | Breed | |
| 7,379,016 B1 | 5/2008 | McEwan | |
| 7,391,339 B2 | 6/2008 | Howard et al. | |
| 7,393,134 B2 | 7/2008 | Mitschele | |
| 7,446,695 B2 | 11/2008 | McEwan | |
| 7,446,699 B2 | 11/2008 | McEwan | |
| 7,489,265 B2 | 2/2009 | Egri et al. | |
| 7,508,337 B2 | 3/2009 | Morinaga et al. | |
| 7,551,703 B2 | 6/2009 | McEwan | |
| 7,573,400 B2 * | 8/2009 | Arnold ..................... | G01S 13/34 340/907 |
| 7,579,964 B2 * | 8/2009 | Nath ................... | G06Q 30/0284 235/382 |
| 7,592,944 B2 | 9/2009 | Fullerton et al. | |
| 7,675,455 B2 | 3/2010 | Hatono | |
| 7,786,927 B2 | 8/2010 | Kondoh | |
| 7,812,760 B2 * | 10/2010 | Teshirogi ................ | G01S 7/282 342/118 |
| 7,817,080 B2 | 10/2010 | Aoyagi et al. | |
| 7,825,826 B2 * | 11/2010 | Welch ..................... | G07B 15/02 340/932.2 |
| 7,854,310 B2 * | 12/2010 | King ..................... | G06Q 20/127 194/350 |
| 7,864,100 B2 | 1/2011 | McEwan | |
| 7,868,784 B2 * | 1/2011 | Kuo ..................... | G06Q 10/02 340/928 |
| 7,874,482 B2 * | 1/2011 | Mitschele .......... | G06Q 20/0652 235/380 |
| 7,889,118 B1 | 2/2011 | Finley et al. | |
| 7,905,402 B2 * | 3/2011 | Kwak ..................... | G06Q 10/02 235/375 |
| 7,952,515 B2 | 5/2011 | McEwan | |
| 7,994,968 B2 | 8/2011 | McEwan | |
| 8,115,673 B1 | 2/2012 | McEwan | |
| 8,164,508 B2 | 4/2012 | Merli et al. | |
| 8,264,401 B1 * | 9/2012 | Kavaler ................. | G01S 13/14 342/128 |
| 8,299,942 B2 * | 10/2012 | Ko ........................ | G06T 3/4038 340/435 |
| 8,466,831 B2 | 6/2013 | Pierno et al. | |

(56) References Cited

U.S. PATENT DOCUMENTS

| | | | | |
|---|---|---|---|---|
| 8,595,054 B2* | 11/2013 | King | | G06Q 20/127 |
| | | | | 340/870.02 |
| 8,671,002 B2* | 3/2014 | Stefik | | G08G 1/142 |
| | | | | 705/5 |
| 8,831,970 B2* | 9/2014 | Weik, III | | G06Q 10/00 |
| | | | | 705/13 |
| 8,872,674 B1* | 10/2014 | Subramanya | | G01S 7/2926 |
| | | | | 340/933 |
| 9,031,738 B2* | 5/2015 | Juzswik | | B60C 23/0416 |
| | | | | 701/32.7 |
| 9,196,097 B2* | 11/2015 | Jones | | G07B 15/02 |
| 9,418,551 B2* | 8/2016 | Kavaler | | G01S 13/931 |
| 9,530,253 B2* | 12/2016 | Banatwala | | G07B 15/02 |
| 9,589,467 B2* | 3/2017 | De La Plaza Ortega | | |
| | | | | G08G 1/144 |
| 9,713,675 B2* | 7/2017 | Levien | | G05D 1/0011 |
| 9,743,657 B2* | 8/2017 | Rich | | G08B 21/18 |
| 10,121,172 B2 | 11/2018 | Hudson et al. | | |
| 2002/0072964 A1 | 6/2002 | Choi | | |
| 2002/0189336 A1 | 12/2002 | McEwan | | |
| 2003/0025626 A1 | 2/2003 | McEwan | | |
| 2003/0071754 A1 | 4/2003 | McEwan | | |
| 2004/0168512 A1 | 9/2004 | McEwan | | |
| 2004/0226993 A1 | 11/2004 | Fulcher et al. | | |
| 2004/0254840 A1* | 12/2004 | Slemmer | | G06Q 10/02 |
| | | | | 705/22 |
| 2005/0099320 A1 | 5/2005 | Nath et al. | | |
| 2005/0164643 A1 | 7/2005 | McEwan | | |
| 2005/0168352 A1* | 8/2005 | Tomer | | G07B 15/02 |
| | | | | 340/932.2 |
| 2006/0074546 A1 | 4/2006 | DeKock et al. | | |
| 2006/0125683 A1 | 6/2006 | Steinbuch | | |
| 2006/0136131 A1 | 6/2006 | Dugan et al. | | |
| 2006/0152349 A1* | 7/2006 | Ratnakar | | G07B 15/00 |
| | | | | 340/426.1 |
| 2006/0170587 A1 | 8/2006 | Kai | | |
| 2006/0212344 A1* | 9/2006 | Marcus | | G07B 15/02 |
| | | | | 705/13 |
| 2006/0259354 A1* | 11/2006 | Yan | | G06Q 20/127 |
| | | | | 705/13 |
| 2007/0024488 A1 | 2/2007 | Zemany et al. | | |
| 2007/0159378 A1 | 7/2007 | Powers et al. | | |
| 2007/0177704 A1 | 8/2007 | McEwan | | |
| 2007/0192391 A1 | 8/2007 | McEwan | | |
| 2007/0200749 A1 | 8/2007 | McEwan | | |
| 2007/0210935 A1* | 9/2007 | Yost | | G07F 17/246 |
| | | | | 340/932.2 |
| 2007/0210955 A1 | 9/2007 | McEwan | | |
| 2007/0276600 A1 | 11/2007 | King et al. | | |
| 2008/0030373 A1 | 2/2008 | Montgomery | | |
| 2008/0048905 A1 | 2/2008 | McEwan | | |
| 2008/0077327 A1 | 3/2008 | Harris et al. | | |
| 2008/0158010 A1* | 7/2008 | Nath | | G06Q 30/0284 |
| | | | | 340/932.2 |
| 2008/0319837 A1* | 12/2008 | Mitschele | | G07B 15/02 |
| | | | | 705/13 |
| 2009/0033539 A1 | 2/2009 | Zemany | | |
| 2009/0051581 A1 | 2/2009 | Hatono | | |
| 2009/0135044 A1 | 5/2009 | Sutphin | | |
| 2009/0303100 A1 | 12/2009 | Zemany | | |
| 2010/0073221 A1 | 3/2010 | McEwan | | |
| 2010/0214157 A1 | 8/2010 | McEwan | | |
| 2010/0214158 A1 | 8/2010 | McEwan | | |
| 2010/0245161 A1 | 9/2010 | Spreadbury | | |
| 2010/0265118 A1* | 10/2010 | Merli | | G01S 7/2927 |
| | | | | 342/27 |
| 2010/0274446 A1* | 10/2010 | Sasajima | | G08G 1/14 |
| | | | | 701/36 |
| 2011/0102197 A1 | 5/2011 | Herwich | | |
| 2011/0205087 A1 | 8/2011 | Kell et al. | | |
| 2011/0221624 A1 | 9/2011 | Kavaler | | |
| 2011/0241857 A1 | 10/2011 | Bradenburger et al. | | |
| 2012/0065858 A1 | 3/2012 | Nickolaou et al. | | |
| 2012/0078686 A1* | 3/2012 | Bashani | | G07B 15/02 |
| | | | | 705/13 |
| 2012/0095812 A1 | 4/2012 | Stefik et al. | | |
| 2012/0158466 A1* | 6/2012 | John | | G07B 15/02 |
| | | | | 705/13 |
| 2012/0285790 A1* | 11/2012 | Jones | | G06Q 30/0284 |
| | | | | 194/217 |
| 2013/0057686 A1 | 3/2013 | Genc et al. | | |
| 2013/0099943 A1 | 4/2013 | Subramanya | | |
| 2013/0176161 A1 | 7/2013 | Derham et al. | | |
| 2013/0297387 A1* | 11/2013 | Michael | | G08G 1/0112 |
| | | | | 705/13 |
| 2014/0210646 A1* | 7/2014 | Subramanya | | G06K 9/00812 |
| | | | | 340/928 |
| 2014/0214500 A1* | 7/2014 | Hudson | | G06Q 30/0284 |
| | | | | 705/13 |
| 2014/0218527 A1* | 8/2014 | Subramanya | | G01S 13/50 |
| | | | | 348/148 |

FOREIGN PATENT DOCUMENTS

| | | | | |
|---|---|---|---|---|
| EP | 1048960 | | 11/2000 | |
| EP | 2237062 | | 10/2010 | |
| EP | 2418508 | | 2/2012 | |
| EP | 2444924 | | 4/2012 | |
| EP | 2444924 A1 * | | 4/2012 | G06Q 10/02 |
| EP | 2608184 A1 * | | 6/2013 | G08G 1/143 |
| JP | 01035699 | | 2/1989 | |
| JP | 09-228679 | | 9/1997 | |
| JP | 2002-117482 | | 4/2002 | |
| JP | 2007-101490 | | 4/2007 | |
| KR | 10-0472080 | | 3/2005 | |
| KR | 20080111662 | | 12/2008 | |
| KR | 20110020677 | | 3/2011 | |
| WO | WO 01/42904 | | 6/2001 | |
| WO | WO 2007/122873 | | 11/2007 | |
| WO | 2012154902 | | 11/2012 | |

OTHER PUBLICATIONS

Auto-ID mobile information system for vehicle data management; Bajic; 2002. (Year: 2002).*

Wireless sensor network for target detection, classification and tracking; Arora; 2004. (Year: 2004).*

Overview of Management Strategies; Weinberger; 2010. (Year: 2010).*

International Preliminary Report and Written Opinion for Application No. PCT/US2012/036615 dated May 1, 2014.

International Search Report with Written Opinion of the International Searching Authority from PCT/US2014/027263; dated Sep. 29, 2014.

Arora, "A line in the sand: a wireless sensor network for target detection, classification, and tracking," Computer Networks 46 (2004), pp. 605-634.

Ditzel, "Low-power Radar for Wireless Sensor Networks," Proceedings of the 3rd European Radar Conference, Manchester UK, Sep. 2006, pp. 139-141.

McEwan and Hanks, "High voltage picosecond pulse generation using avalanche diodes," SPIE vol. 1346 Ultrahigh- and High-Speed Photography, Videography, Photonics, and Velocimetry '90, pp. 465-470.

McEwan Technologies Micropower Impulse Radar (MIR), Science & Technology Review, Jan./Feb. 1996, pp. 17-29.

International Preliminary Report on Patentability and Written Opinion of the International Searching Authority for Application No. PCT/US2014/027263 dated Sep. 15, 2015.

Communication and Extended European Search Report from corresponding European Application No. 14769874.0, dated Oct. 25, 2016.

Partial European Search Report for EP 19 21 1921 dated Jun. 26, 2020; 3 pgs. and Annex to the European Search Report 6 pgs.

(56) References Cited

OTHER PUBLICATIONS

Partial European Search Report for EP 19 21 1921 dated Jun. 26, 2020; 3 pgs. and Annex to the European Search Report 2 pgs.

* cited by examiner

ADVANCED PARKING MANAGEMENT SYSTEM

CROSS-REFERENCE TO RELATED APPLICATIONS

This application claims priority to U.S. Provisional Patent Application No. 61/746,842, filed on Dec. 28, 2012, the entire contents of which are incorporated herein by reference.

This application claims priority to U.S. Provisional Patent Application No. 61/790,209, filed on Mar. 15, 2013, the entire contents of which are incorporated herein by reference.

This application contains subject matter related to U.S. patent application Ser. No. 13/464,706, filed May 4, 2012, which claims priority to U.S. Provisional Application Nos. 61/549,029, filed Oct. 19, 2011, and 61/638,173, filed Apr. 25, 2012, the entire contents of which are incorporated herein by reference.

This application contains subject matter related to U.S. patent application Ser. No. 13/804,957, filed on Mar. 14, 2013, which claims priority to U.S. patent application Ser. No. 13/464,706, filed May 4, 2012, which claims priority to U.S. Provisional Application Nos. 61/549,029, filed Oct. 19, 2011, and 61/638,173, filed Apr. 25, 2012, the entire contents of which are incorporated herein by reference.

BACKGROUND OF THE DISCLOSURE

Many needs of parking management, especially in on-street situations in urban areas, are not being met with current technology. Parking management systems that include accurate space occupancy detection do not include unique vehicle identification for vehicle based parking access and rate determination, motorist guidance, violation detection, and enforcement automation support. For example, there are situations where parking access and payment rates are determined by the individual vehicle or motorist, such as for a vehicle with handicapped access allowance, a governmental vehicle, a vehicle with a residential or visitor parking permit, etc.

Current surveillance and photo enforcement systems have limited usefulness due to significant power consumption, which ties such systems down to fixed infrastructure like dedicated or street poles. In some case, large battery operated devices, though portable, are very difficult to use, transport, and operate. One reason for photo enforcement is to modify motorist behavior and reduce accident rates. However having cameras in fixed locations, where motorists can get used to them, or the cameras are bulky such that they are highly visible often negates these motorist behavior modification benefits. Also, the cameras typically are placed at locations that are most suitable for fixed infrastructure (such as access to power and communications systems) rather than for actual traffic engineering needs (such as accident prone locations where the need to constantly measure motorist behavior is needed). These are big issues for today's photo enforcement technology and a significant reason for the poor performance of photo enforcement programs in terms of reducing crash rates and achieving crash rate reduction benefits that are commensurate with the total public and governmental expenditure on such programs.

A similar issue exists in the field of security surveillance cameras, especially those operated by police and city safety agencies. It is important in many applications that security agencies be able to place cameras quickly based on emerging surveillance needs and evolving threat scenarios and move them around as needed. However, deficiencies in security surveillance cameras prevent this from occurring.

Manual vehicle clamps are commonly used for violation and scofflaw enforcement. There are some devices with electronic keypads. However, these electronic keypads are vulnerable to the elements. For example, the keypads can become clogged with dirt. Also, the code can be incorrectly entered or, if the clamp gets stolen, there is no way to track it; furthermore, there is no way for a remote operator to know the status of the clamp. Functional wireless versions of the clamp have not been created due to the high power consumption of the modems needed.

These and other drawbacks exist.

SUMMARY OF THE DISCLOSURE

An exemplary embodiment includes a parking management system having: a roadside unit including a vehicle occupancy sensor with a zone of detection that corresponds to a parking space being monitored, a radio frequency (RF) transceiver with a first antenna that radiates towards the parking space to communicate with an in-vehicle transceiver and a second antenna that radiates in a direction to communicate via nearby gateways or cellular towers; an imaging camera system with at least one imaging sensor for collecting secondary evidence relating to a plurality of spaces and shared across the plurality of spaces; a guidance display indicating the number of parking spaces available in a given zone or direction of travel; and an in-vehicle device with a battery operated RF transceiver that is designed to communicate with the roadside unit.

These and other embodiments and advantages of the embodiments will become apparent from the following detailed description, taken in conjunction with the accompanying drawings, illustrating by way of example the principles of the various exemplary embodiments.

DETAILED DESCRIPTION OF THE DISCLOSURE

Figure 1:
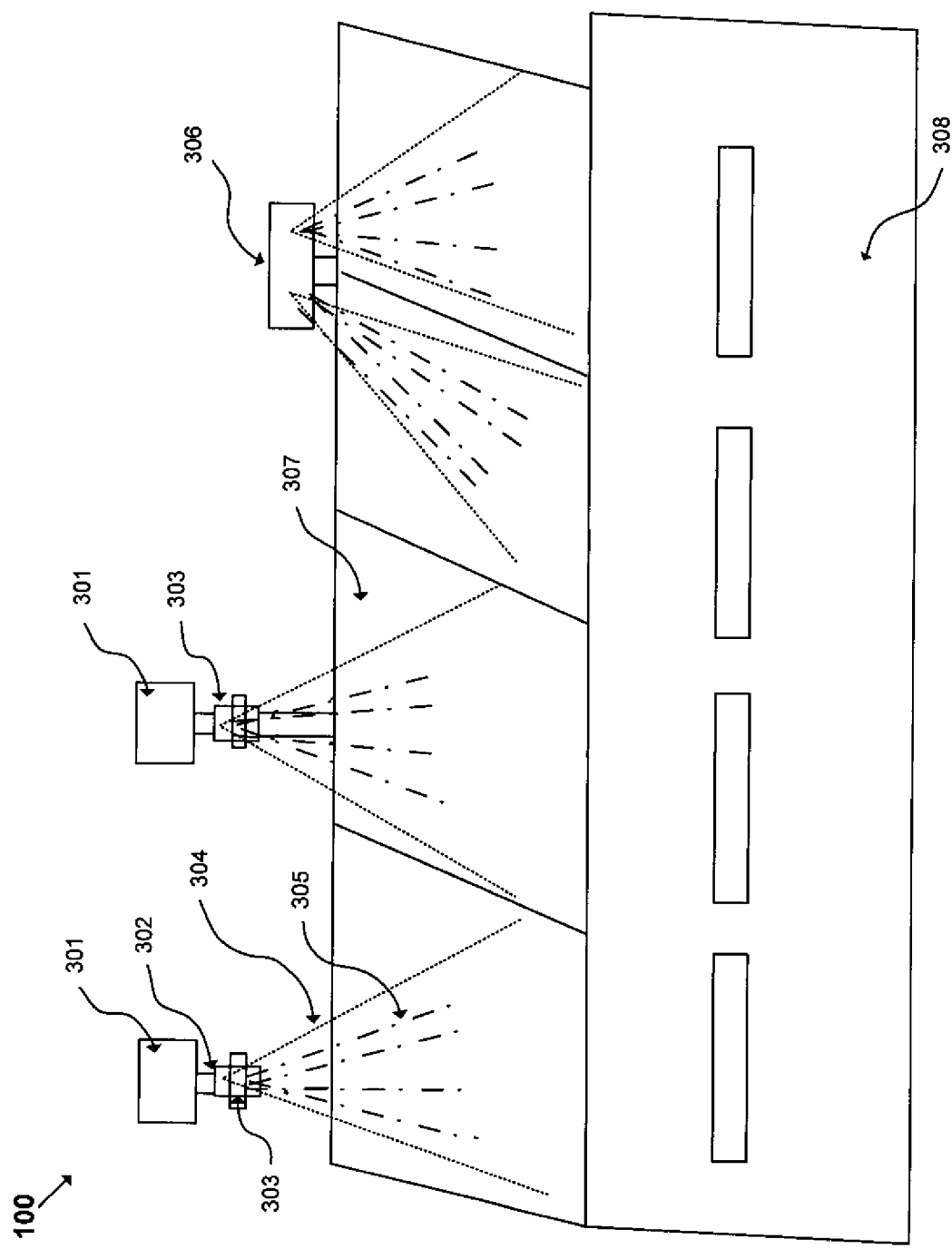
FIG. 1 depicts example parking space geometries with occupancy and vehicle identification sensors collocated with pole mount and curb mount configurations in accordance with an exemplary embodiment.

The following description is intended to convey a thorough understanding of the embodiments described by providing a number of specific embodiments and details of an advanced parking management system. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

A well-managed parking system requires unique vehicle identification for vehicle based parking access and rate determination, motorist guidance, violation detection, and enforcement automation support. The disclosed embodiments enable advanced parking management features in a meter-less configuration, thereby potentially avoiding a large portion of capital and operating expenses to cities (in parking meters and the like). The disclosed embodiments make it possible to uniquely identify stationery or moving vehicles from very low power infrastructure components and provide on-street dynamic signage and guidance to motorists, take camera images from multiple angles to provide secondary revenue collection as well as enforcement evidence, and automation of booting processes for violator vehicles.

Exemplary embodiments may have a radio transceiver collocated with a directional time of flight radar sensor or another suitable vehicle occupancy sensor that has a defined zone of detection coinciding with a zone of interest, such as the expected location of a vehicle within a parking space, near an access control device, etc. The radio transceiver can have one or more antenna elements, at least one of which radiates preferentially in the direction of said zone of interest. The radio transceiver and the directional sensor may be collocated and electrically coupled via analog or digital communication means, including but not limited to TTL level signaling, serial or parallel data communication, analog signaling, or other suitable means.

The radio transceiver and the sensor, in exemplary embodiments, are collocated within the same enclosure and share a common power supply or source, such as a battery. However, in some embodiments, they can be nearby separate enclosures that are electrically coupled to each other. The radio transceiver is placed adjacent to the zone of detection, such as on a pole mount, attached to a parking meter or an access control device, on a nearby curb face or top surface, within the zone of detection in a subterranean configuration, etc. According to exemplary embodiments, these locations are generally referred to as "roadside".

The system can further consist of an in-vehicle device or transceiver that is placed inside a vehicle. The in-vehicle device can have its own battery and an antenna element. The in-vehicle device can be passive in some embodiments without its own power source. The in-vehicle device can be mounted at a convenient location, such as behind the windshield or the back glass of the vehicle or can be mounted on the exterior or the underside of the vehicle chassis at a suitable location. The underside mounting may be more suitable in areas where the parking sensor is buried in the ground in a subterranean configuration.

The collocation and integration with the parking space occupancy sensor can serve multiple purposes. The determination of the space occupancy change (such as when a vehicle enters or exits) can be used to power-up, wake-up, or trigger the radio transceiver. Also, the knowledge of the space occupancy change can be used to interpret the signals from the in-vehicle device. For example, in an embodiment where the in-vehicle device is an active device and transmits information as a periodic beacon, finding a new beacon coincident with a new vehicle arrival will make it a high probability that the new beacon belongs to the arriving vehicle. Conversely, if the occupancy sensor detects no change but a new beacon is picked up, then the sensor can keep that beacon as belonging to a nearby space and less likely it is from its own space. These techniques are important because the radio transceiver used for vehicle identification will be of higher power and a lower or different frequency than a broad spectrum radar occupancy detector and it may not be possible to localize the antenna coverage area as precisely as desired and adjacent spaces as well as vehicles on nearby road lanes may be picked up. It is important in many applications to identify a vehicle's location within a parking space or similar with a high degree of certainty, even if some applications can tolerate a small error in such location identification.

FIG. 1 depicts example parking space geometries 100 with collocated occupancy and vehicle identification sensors in pole mount 303 and curb mount 306 configurations. Pole 302 is shown as a mounting location for the sensors as well signage or a parking meter 301. The vehicle sensing sensors can have one or more detection zones 305 that are used to cover a defined zone of interest 307. A vehicle identification transceiver with preferential radiation 304 towards the zone of interest is also shown. Traffic lanes in the roadway 308 are also shown in an on-street parking configuration.

Figure 2:
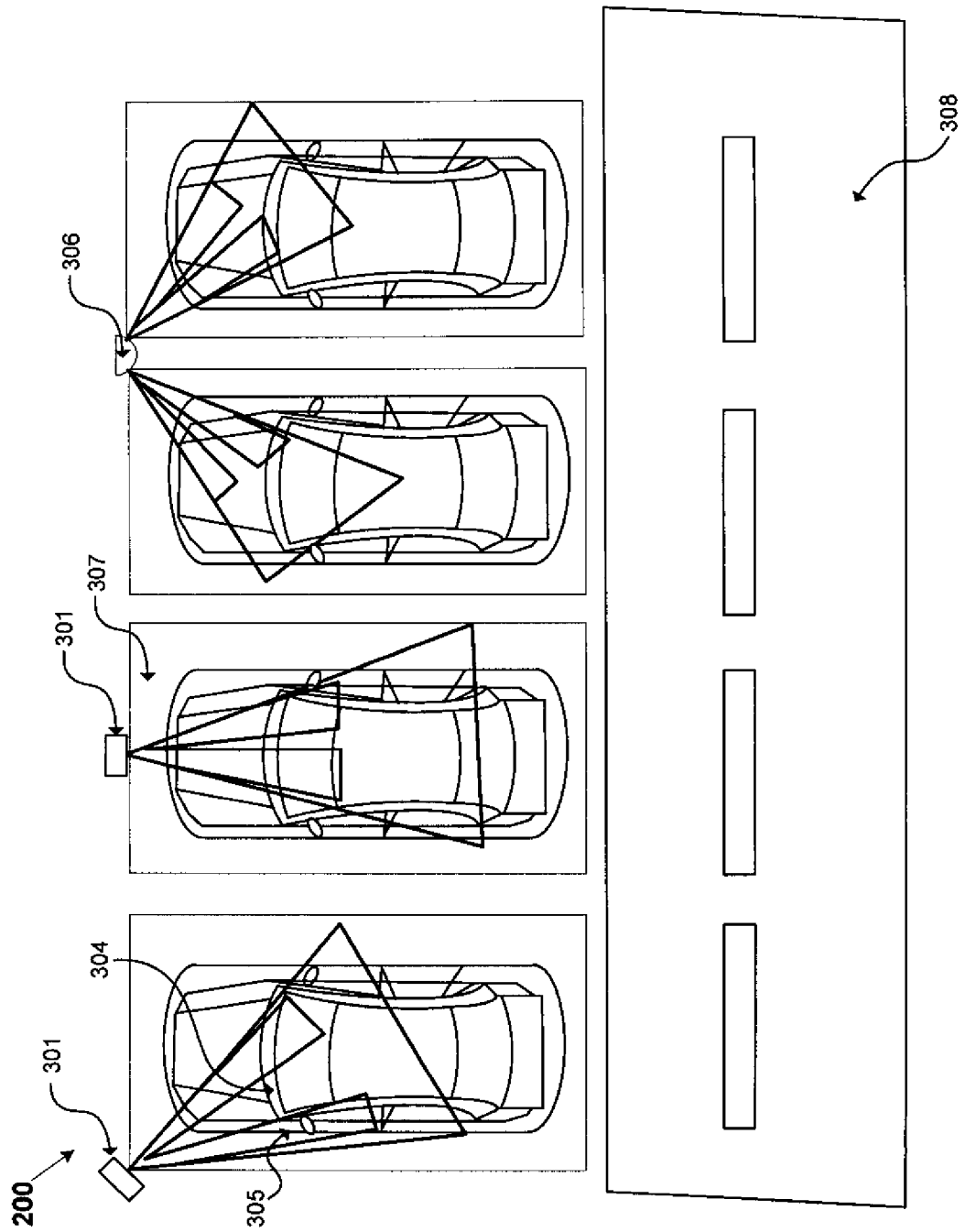
FIG. 2 depicts example parking space geometries with occupancy and vehicle identification sensors in a single space and dual space configuration in accordance with an exemplary embodiment.

FIG. 2 depicts example parking space geometries 200 with occupancy and vehicle identification sensors in a single space and dual space configuration. The spaces are on-street, such as on a roadway 308. Example geometries of vehicle sensing zones 303 and a vehicle identification field of view 304 from a single space collocated sensor 301 with a parking space 307 are shown. Also shown is a geometry with a collocated double space sensor 306 wherein the sensor is mounted at the mutual boundary of the two adjoining spaces.

Figure 3:
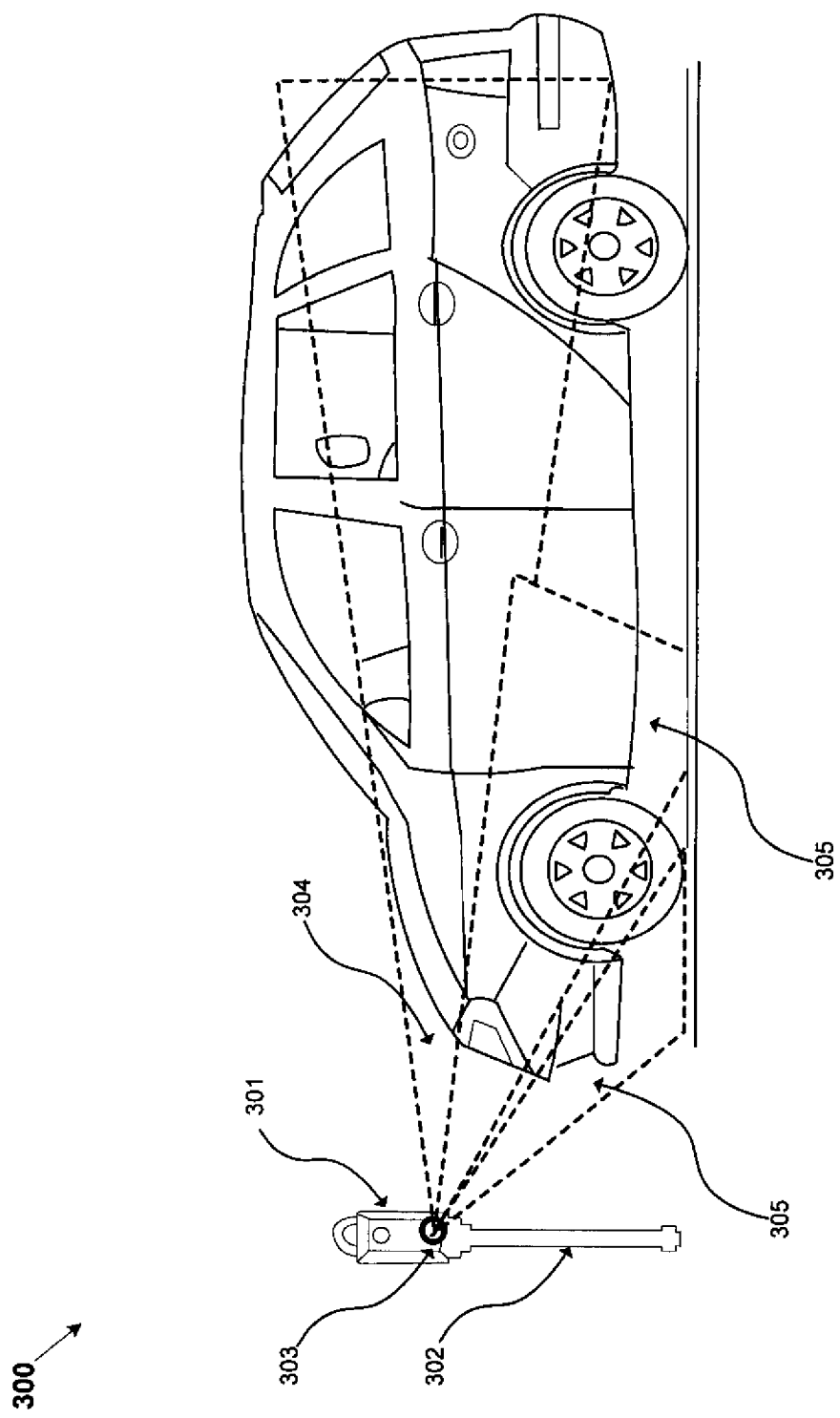
FIG. 3 depicts an example of parking space geometry with the occupancy and vehicle identification sensor integrated with a parking meter in accordance with an exemplary embodiment.

FIG. 3 depicts an example parking space geometry 300 with the occupancy and vehicle identification sensors 303 integrated with a parking meter 301 and mounted on a pole 302. Vehicle occupancy sensing beams 305 with fields of view designed to encompass the zone of interest and a separate vehicle identification field of view 304 designed to target an in-vehicle device are shown.

Figure 4:
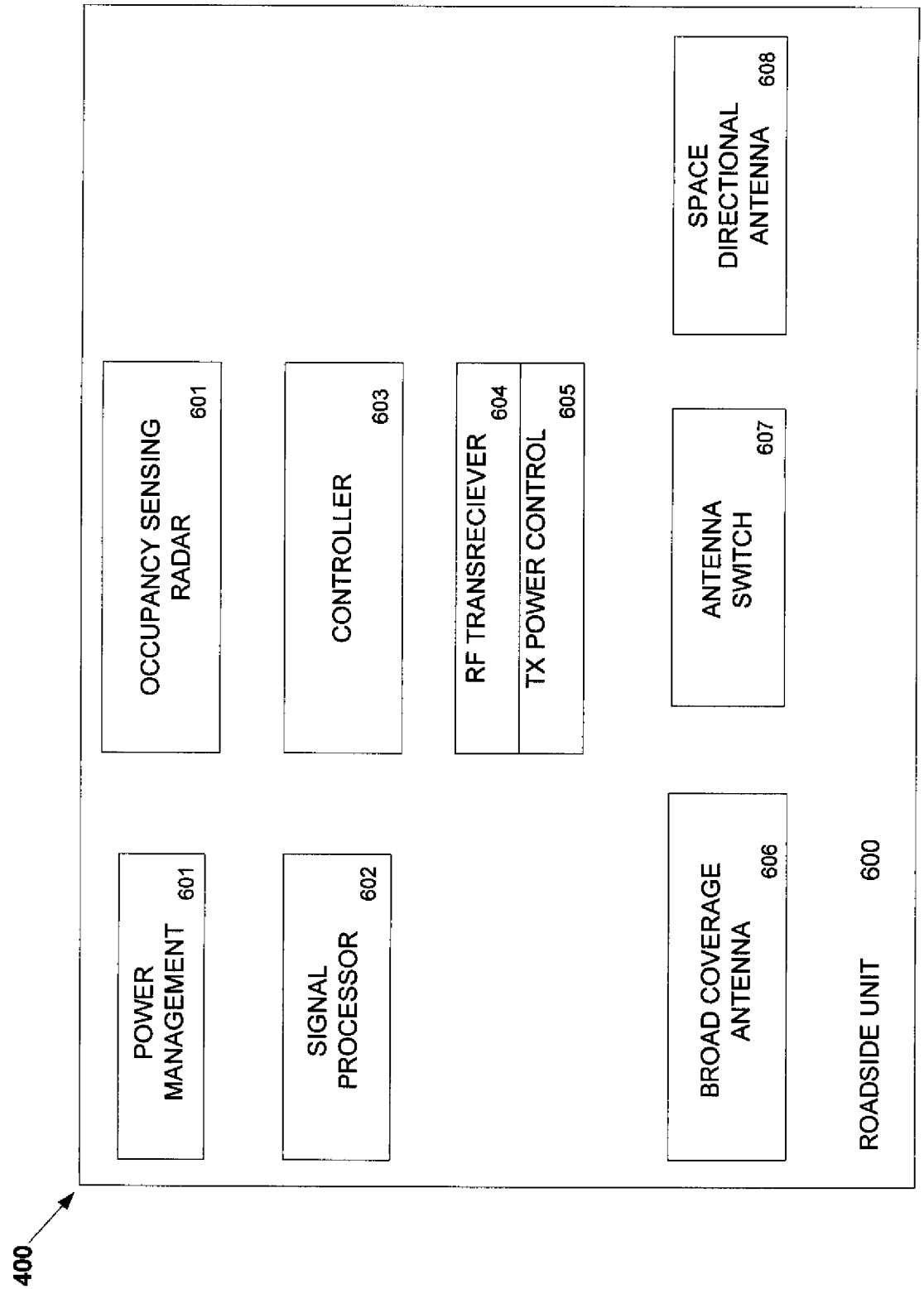
FIG. 4 depicts a schematic block diagram of a roadside unit in accordance with an exemplary embodiment.

FIG. 4 depicts an example schematic block diagram of a roadside unit configuration 400 with a roadside unit 600. The units may utilize a battery, solar or other suitable power source that may be shared with a parking meter or provided by a utility. The power management section ensures energy is being utilized optimally, the controller 603 along with the signal processor 602 work together to operate the device and process raw analog data from an occupancy sensing radar 601. In addition the RF transceiver 604 can be frequency and power level controlled internally within its own software. An antenna switch 607 is used to share antenna elements 606, 608 with the RF transceiver 604.

The communication between the in-vehicle device and the roadside transceiver can be implemented in many ways. Battery optimization on both the in-vehicle device and the roadside device may be a significant consideration in establishing the communication mechanism.

In the simplest form, the communication can be one-way, wherein the in-vehicle device emits a beacon with its unique ID and the roadside transceiver will listen for such beacon, either constantly or periodically and in conjunction with the occupancy state change events.

In other embodiments, the communication mechanism is two-way and can be initiated either by the in-vehicle device or by the roadside device. The two-way communication can be implemented even if the in-vehicle device is a passive device, such as a passive RFID tag.

The two-way communication can enable many security schemes, such as challenge-response and other encryption schemes that can be difficult to tamper or copy. This is important in many applications, the vehicle identification is used to either grant access for the vehicle or to provide preferential treatment such as parking permits, length of stay or discounted parking, etc., as well as other fraudulent attempts that may be made to utilize these services.

In some embodiments, to aid in initial pairing or detection, the in-vehicle device can transmit its identification periodically, as an example, every 1-5 seconds and the roadside device can listen in for 1-5 seconds every 15-30 seconds to ensure a suitable overlap in transmit and receive times. The reverse way wherein the roadside device transmits periodically can also be implemented.

The in-vehicle device can be used in a system without the occupancy sensor and can be used in conjunction with handheld or vehicle mounted readers.

In some embodiments either device can initiate the communication, and both can have transmit and receive cycles. In some embodiments, radio-triggered wake-up can be used to wake up the other device. A radio signal of suitable strength and a known frequency can be used to wake up the other device. This is useful in managing the battery life of the devices. In some embodiments, the wake-up signal may be the occupancy sensor signal with a special marker. For example, if the occupancy sensor transmits a pulse of a specific duration that is different from its normal sensing duration, the in-vehicle device may be configured to listen to this signal and wake up. With this capability, when a new vehicle arrives and is yet to be identified, the roadside unit can attempt to wake up or synchronize the in-vehicle unit with its special marker.

In some embodiments, the transceiver used for vehicle identification can also be used for wireless communications between the roadside device, including the occupancy sensor, and a backend network for the purposes of communicating with a server either for data repository purposes or for querying the server or database for access grant or preferential treatment purposes. Such wireless communication links can be used to convey health and telemetry of the roadside nodes and for wireless firmware and software updates. In some embodiments, the roadside device can also get health and telemetry information from the in-vehicle device and convey that to the server and also act as a bridge to facilitate software updates for the in-vehicle device. Such software updates may also be used to transmit new security keys or ciphers to the roadside or in-vehicle devices or can be used to shut down an in-vehicle device, for example, where fraudulent use is suspected.

In some embodiments, the roadside device can have one, two, three or more antennas or feed points within an antenna structure. For example, it can have one antenna for a highly directional transmission of a signal towards the zone of interest for vehicle identification purposes, one antenna for a broader spatial coverage transmission for wireless communication to a backend server and one or more antennas for broad spectrum radar. The device can vary the power levels or frequencies between the two transmissions. An exemplary configuration uses a single ISM band radio transceiver with software controlled power levels and frequency channels and an antenna switching device to switch between the highly directional antenna and the broad direction antenna.

The switched antenna configuration can be used to listen to the signal from the in-vehicle device either in the same transmission burst or in separate bursts and use the measured power levels between the two antennas to determine the probability that the in-vehicle device is located with-in the zone of interest. For example, for a given set of antennas, the difference in the received signal strength between the highly directional (and higher gain) and the broad coverage (and lower gain) maybe the highest if the vehicle is within the high gain direction of the highly directional antenna. The antennas can be shared or be separate from the occupancy sensor radar antenna. A priori knowledge of the antenna gains is usually available and can be used in these calculations.

In some embodiments, the persistence of the in-vehicle device with respect to the roadside device can be used to differentiate between vehicles in the zone of interest, such as a parked car from other nearby transitory vehicles.

In some embodiments, sensors can use laser, visible, NIR, or IR LED or laser diodes, ultrasound, NIR or IR triangulation based sensors with or without a linear photo sensor array, FMCW, Doppler, inductance sensing, imaging, passive acoustic, optical disturbance or other techniques for vehicle detection.

In some embodiments, the unique vehicle identification can be used for automated payment remittance or account charges, or payments to be calculated and charged based on the time the vehicle is parked as calculated after the vehicle departs. Also, based on the vehicle identification and the business and privacy rules set and the type of service, localized information or advertisements can be sent to an in-vehicle device or the user's cell phone or smartphone. This can be used to send reminders or other pertinent messages to the user via their smart phone, cell phone, email, or other electronic means.

In some embodiments, a collection of roadside devices may listen to the in-vehicle device either in a synchronized manner or not and report their signal strengths to the server and the pattern of received signal strengths can be used alone or in conjunction with other information to further narrow down the location of the in-vehicle device.

In some embodiments, the in-vehicle device or the roadside device may incorporate a fixed delay element with an antenna element tuned to a frequency for the purposes of retransmission of the incoming signal. In other embodiments, a synchronization signal such as a sub-microsecond burst from a gateway device that is sufficiently far and at an angle from each of the devices in a way that its signal arrives at the in-vehicle device at near the same time or with a known time lag or lead relative to the roadside devices. The sync signal starts an analog or digital timing circuit in either the roadside or the in-vehicle device and is also reflected from the other device with the fixed delay element after the fixed time delay. The time difference between the sync and the reflected signals can be measured using the analog or digital timing means as a way of determining the distance between the in-vehicle and the roadside device. If more than one roadside device participates in the timing, the information can be uploaded to a server or shared among the roadside device in order to triangulate and further precisely determine the location of the in-vehicle device in relation to the roadside device. This method can determine whether an in-vehicle device is in a near-by parked vehicle or in a further away transit lane. An analog timing circuit, say a ramp voltage with a 100 ns peak-peak duration can be implemented with relative ease and the time gap between the two signals can be easily measured and can be repeated to remove spurious and noise readings. Instead of a fixed delay element, in an alternative embodiment, one of the devices can be designed to transmit a burst after a preset delay. In another alternative embodiment, a precision timing circuit such as those disclosed in the broad spectrum radar timing generator can be used for timing or the digital or analog timing circuit o the broad spectrum radar can be used for this timing.

In some embodiments, the in-vehicle and/or the roadside device may use a specially adapted beacon or synchronization burst that is less than a millisecond, sometimes less than 10 us or even less than 1 us in different embodiments, that may be modulated with small amounts of data for synchronization or for broadcasting full or partial vehicle IDs. Such small bursts may be useful in saving battery life and serving as a synchronization reference may be implemented by adapting an ISM band radio transceiver, for example one primarily meant for 802.15.4 communications by hardware and/or software adaptations.

A plurality of antenna elements can be used in the roadside transceiver to narrow down the direction of arrival of the in-vehicle transceiver signals. The directional roadside transceiver antennas will also transmit predominantly in the direction of the zone of interest, reducing the chances that a stray in-vehicle transceiver will pick up its signal and respond back.

In some embodiments, the roadside devices may be synchronized precisely and measure the relative or absolute arrival time of the in-vehicle device signals and determine the location of the in-vehicle device by means of triangulation. The time of arrival of the leading or trailing edge of the next or subsequent in-vehicle beacon can be measured and reported by the roadside devices, or may be measured by two receiving circuits and antennas on the same roadside device. The two receiving circuits can be in the same or in nearby enclosures and are coupled electrically or wirelessly.

In some embodiments, a marker pulse from the broad spectrum radar can be used for wake-up or for location determination purposes.

The communication between the roadside and in-vehicle devices can be standards based or use a proprietary protocol. The protocol may be further customized to keep the beacon burst very short, for example, less than one or a few milliseconds or even less than a microsecond. The beacon burst may or may not contain all the information needed for the identification. A subsequent time interval after the beacon burst may be used the two devices to signal its need to communicate further and establish two way communications to get the identification information or for authentication or security purposes.

In some embodiments, the in-vehicle device will have a broad coverage or an omni-directional antenna. However, narrow direction antennas may work in some embodiments.

In some embodiments, the in-vehicle device will have visual or auditory feedback mechanism to the motorist. For example, if the vehicle's identification was recognized by the roadside sensor, and LED and/or a buzzer may flash. To conserve battery, the LED may be designed to flash say rapidly for an initial time period and then less rapidly as long as the vehicle is within range of the roadside sensor and the LED may be switched off or have a different period at other times.

In some embodiments, the roadside device may signal the in-vehicle device in order to set the LED rate and duration and the period of such flashing.

Figure 5:
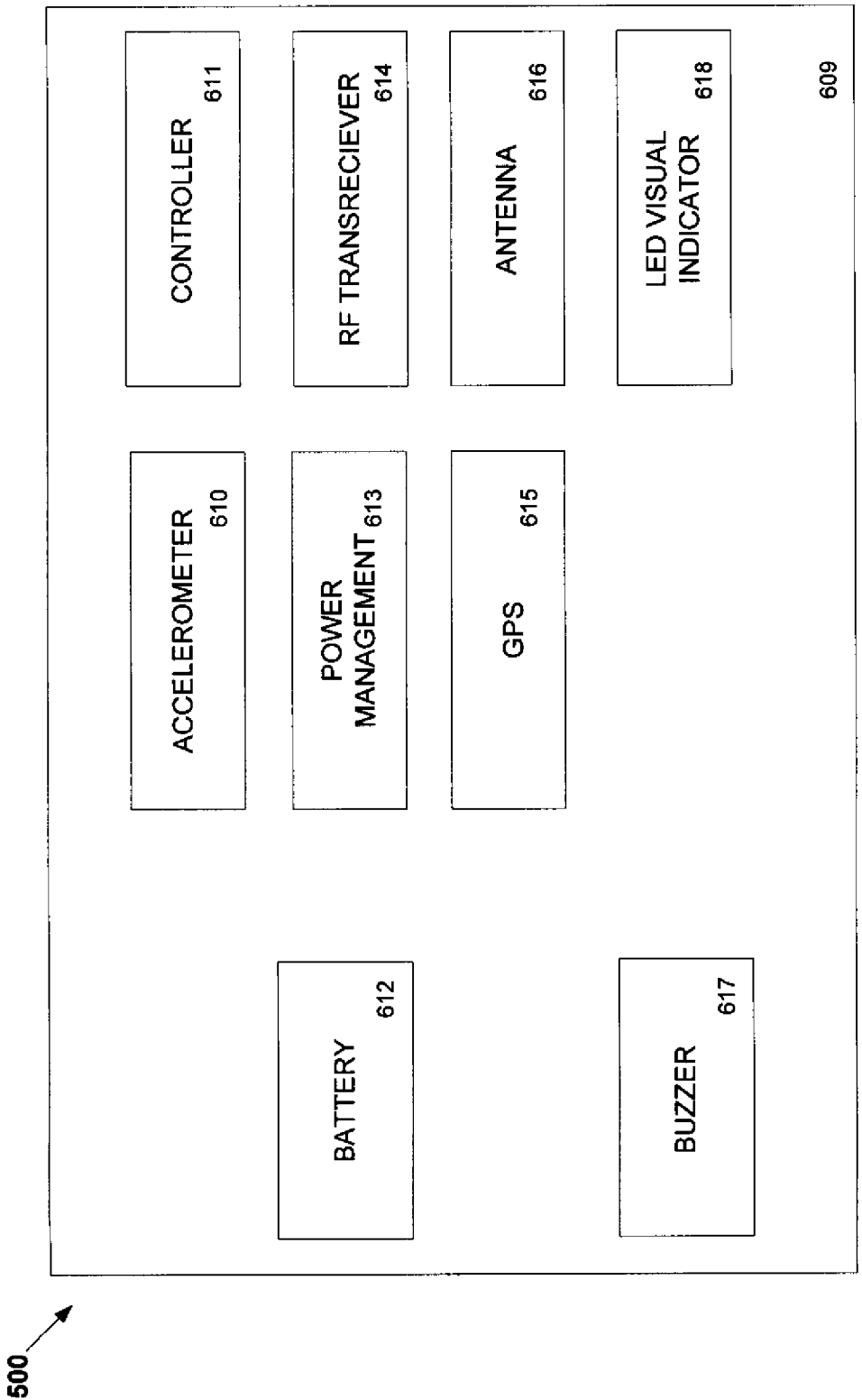
FIG. 5 depicts a schematic block diagram of an in-vehicle unit with accelerometer and GPS capability in accordance with an exemplary embodiment.

FIG. 5 depicts an example schematic block diagram 500 of an in-vehicle unit 609 with accelerometer 610 and GPS capability 615. In this example configuration, a battery 612 provides power for the entire unit. Controller 611 executed program instructions and controls RF transceiver 614 which couples with the antenna 616 and a simple visual indicator 613 and a buzzer 617.

Figure 6:
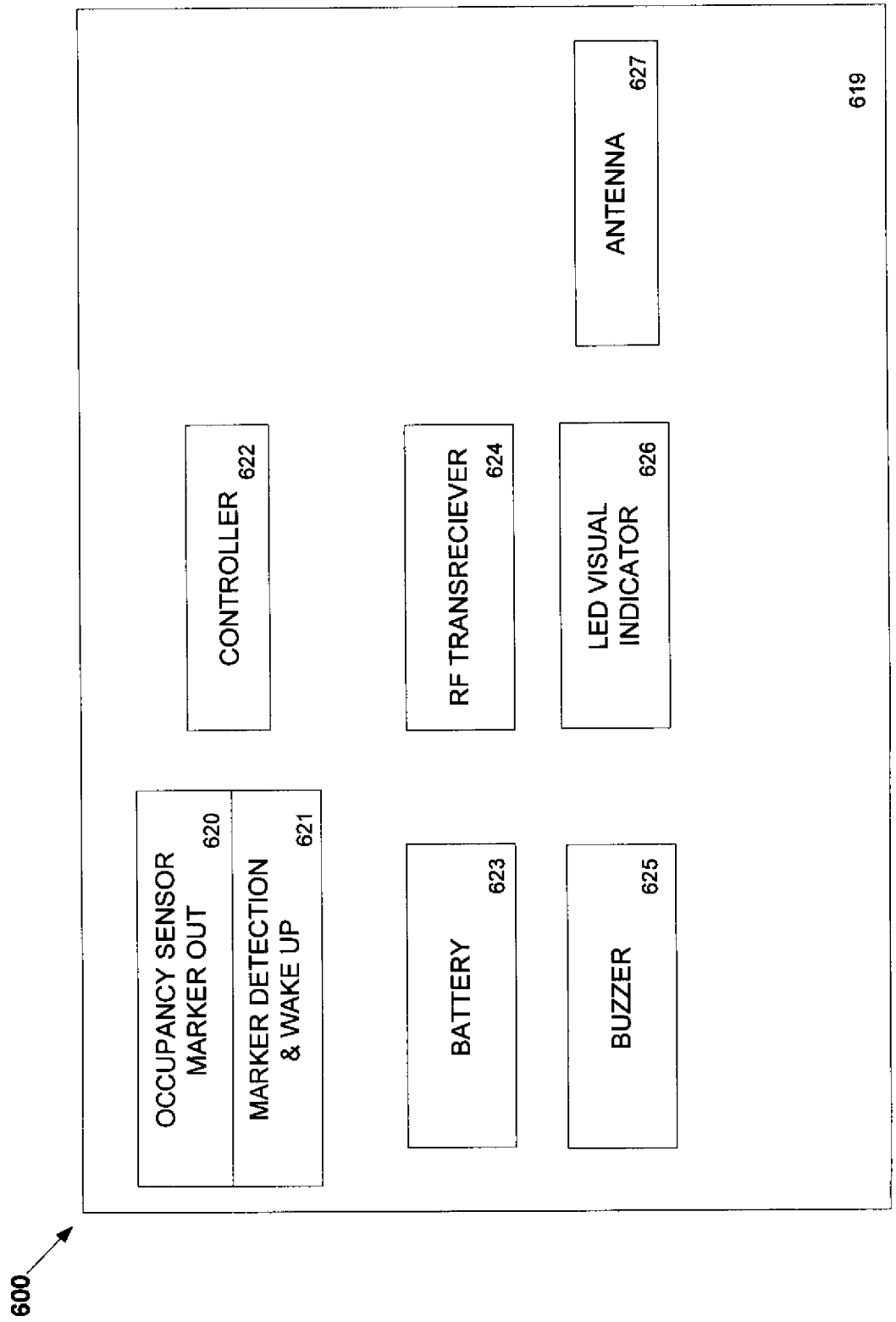
FIG. 6 depicts a schematic block diagram of an in-vehicle unit with marker detection and wake-up capability in accordance with an exemplary embodiment.

FIG. 6 depicts an example schematic block diagram 600 of an in-vehicle unit with marker detection and wake-up capability 621. The marker signal from the occupancy signal is shown as 620. Controller 622 and antenna 627 performs a similar function as before and visual indicator 626 and buzzer 625 performing the user interface function to alert the motorist about whether the in-vehicle device was detected by the roadside unit. Controller 622 executes the program steps necessary and communicates via RF transceiver 624.

Figure 7:
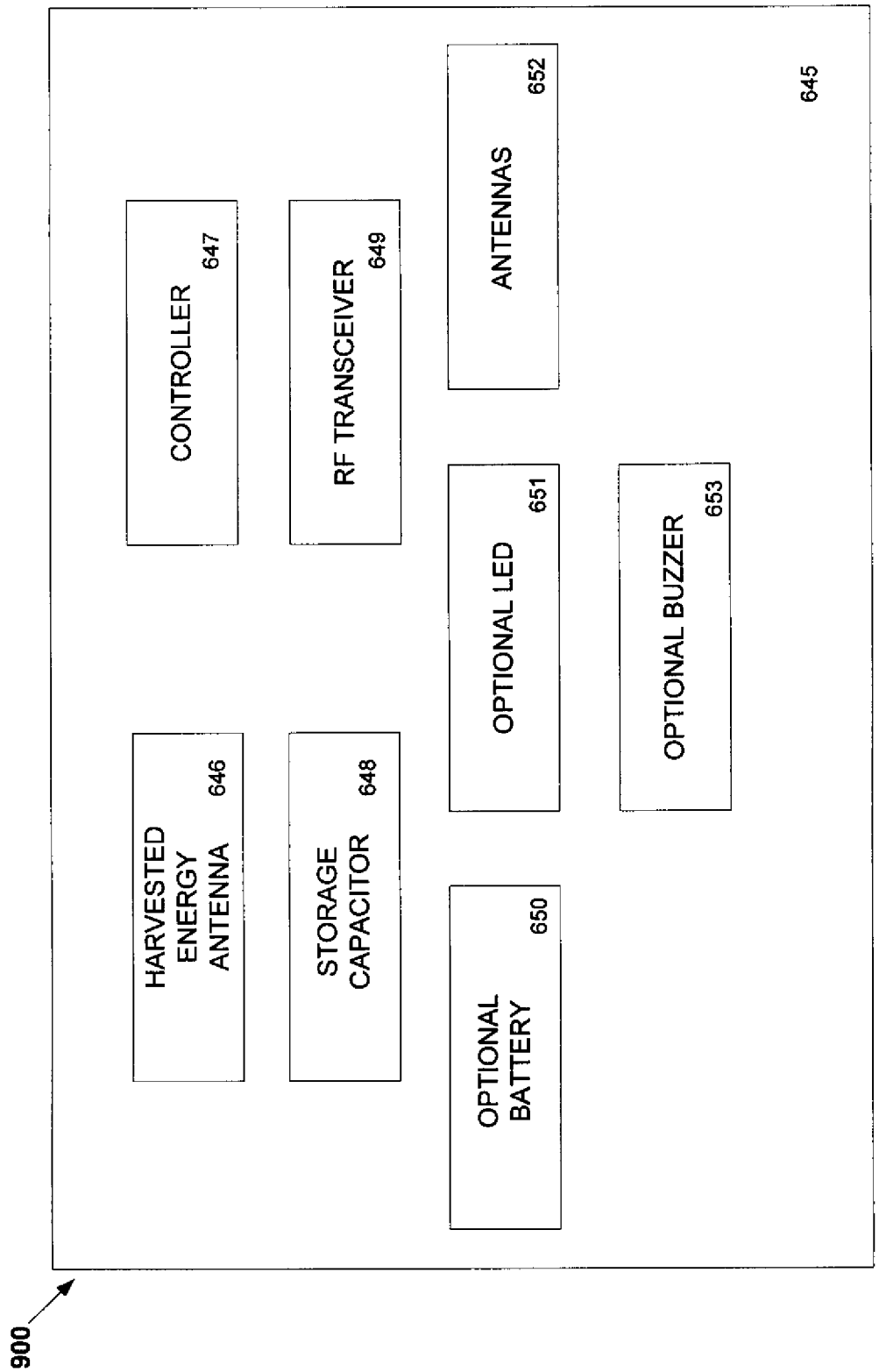
FIG. 7 depicts a schematic block diagram of an in-vehicle device with a harvested energy antenna to fully or partially power the device in accordance with an exemplary embodiment.

FIG. 7 depicts an example schematic block diagram 900 of an in-vehicle device 645 with a harvested energy antenna 646 to fully or partially power the device. Storage capacitor 643 is used to temporarily store the harvested energy. Controller 647 uses RF transceiver 649 coupled with antenna 652 to communicate with the roadside device and control the visual indicator 651 and optional auditory indicator 653. An optional battery 650 can be used where needed.

In some embodiments, the vehicle identification is provided to a parking meter or access control device or similar for applying suitable business rules associated with that vehicle. The vehicle identification can also be provided to handheld or vehicle mounted enforcement or surveillance systems. In some applications, automated camera devices may be used for surveillance or enforcement purposes.

In some embodiments, the time of flight, broad spectrum radars may use different mixing and radar techniques as may be known in the art. Properties of the radar, including PRF, duty cycle, transmit pulse width, receive pulse width, sweep rate, range control, timing control, can all be accomplished under software control using micro controllers, digital signal controllers, microprocessors, and similar and use logic gates, RC circuits, comparators, analog and digital sum circuits for pulse generation and drive generation, including using linearly or exponentially changing signals or signals of other known characteristics. Software control may use one or more DACs, PWM outputs or other digital or analog means. The resulting amplitude modulated video signal or its envelope can be digitized using ADCs or comparators or similar circuits. Various short range determination techniques are described in the said patent applications and can be used. The signal quality can be measured and optimized by measuring the S/N of the resulting video or measuring and adjusting the duty cycle.

The time of flight radars or other roadside sensors can be used with parking meters and parking or traffic management systems for a variety of parking, traffic, and other functions, including as described here and in the said patent applications.

In some embodiments, the sensors can be used in conjunction with roadways, signalized or non-signalized intersections for the purposes of backup detection, and roadway or intersection management. For example, sensors can be mounted at intersection approaches with one or more sensors located near the approach. Each sensor location can have one more zones with each zone being able to detect vehicle presence or movement using ranging and Doppler methods. For example, there may be 3 sensors mounted at an intersection approach such that the sensors are 40 feet apart with each sensor having 4 zones to detect vehicles with a 20 foot range. In this configuration, it is possible to instrument about 160 feet of each intersection approach covering 2 or even 3 lanes each and be able to detect the presence of vehicles and/or movement at each zone. The ability of the software controlled radars to switch between Doppler and ranging modes very quickly can be useful in this application. The sensors can communicate this information to each other or more typically to an intersection controller that is located near or within a traffic control cabinet and coupled electrically or wirelessly to it. The intersection controller can comprise of a wireless transceiver to communicate with the sensors and a wired and wireless transceiver to communicate to the traffic control cabinet or another traffic management system and a cellular or wireless modem to connect to a remote server and can draw power from the cabinet or a nearby power source, including a solar power source. With this configuration, it is possible to know the length of backup at a traffic light at each approach, the duration since the light turns green for vehicles to move at a zone, the occupancy percentage and even the number of vehicles moving over a roadway, and a number of other traffic measurements all of which can be fed to the intersection controller to make decisions about controlling the signal timings and to provide data and alerts to a traffic management system.

Further, a network of such sensors with or without intersection controllers can be used to optimize or improve traffic flow along a section of a roadway or multiple roadways and will constitute a vast improvement over loops, cameras, and other devices used in many intersections currently. The sensor placement and system design can also be used to detect abnormal traffic patterns such as when a disabled vehicle is blocking a lane at an intersection approach or a roadway. The system can be useful in developing countries where there is a mix of vehicle types of the roadway and the traffic patterns are not well adhered to. Such a system can take the data from the individual sensors and intersections and use simulations and predictive techniques to determine various timing scenarios and adjust or synchronize the timings of intersection signals. Dynamic message signs and variable speed limit determination and signage can also be driven based on this information.

In order to conserve battery, the system can incorporate a sleep cycle and can also synchronize its sleep cycle with the intersection controller timing, such that it measures and provide the information only when the intersection controller is ready to use that. For example, once the backup at an approach has cleared out, then the device can go sleep until the next cycle when the next backup is expected. The device can incorporate a dynamic or preprogrammed sleep wake cycle, e.g., 10 or 20 ms every 500 ms or any other suitable combination to save on battery.

The sensors can be useful in detecting platoons of vehicles. In some embodiments, the sensors will identify a platoon of vehicles by using a collocated transceiver or the sensor transceiver itself to communicate with the platoon of vehicles, or a receiver listening to platoon vehicle signals. The sensors can also detect when the platoon has fully entered or crossed the intersection and communicate this information to the signal controller to ensure that the signal is kept green for the platoon to pass fully or otherwise manage the platoon. One or more of these transceivers can use DSRC bands and protocols.

In other embodiments, the sensors can be used to provide calibration reference or additional information to autonomous vehicles. Fully or partially autonomously driven vehicles rely on imaging, lidar, GPS receivers, dead reckoning, and number of other technologies to help navigate and steer the vehicle. Each of these vehicle mounted technologies provide different types of information and also have failure modes, such as fog of snow in case of lidar and visual sensors, signal loss and accuracy in case of GPS, etc. A road based sensor may provide a valuable addition to this mix as a fail-safe mechanism, calibration reference, communications, intersection traversal management, or for other purposes.

For example, the sensor can be used to detect and identify an autonomous vehicle, mass transit vehicle or other vehicle requiring special access, either uniquely or by type of vehicle, and communicate with it using a one way or two way communication or indication that it is approaching an intersection. This can trigger a primary or fail safe mechanism in the autonomous vehicle or used to provide an alert to a person in the vehicle. The approaching vehicle information can be provided to the intersection controller and/or two way communications can be facilitated to coordinate the vehicle's traversal with other regular or autonomous or mass transit vehicles according to the business rules of the intersection, including prioritized traversal. For the intersection controller, positively identifying the vehicle at a certain point using the ranging, precise zone, and/or vehicle identification capabilities of the sensor is a huge advantage in ensuring that it is communicating with the right vehicle and that reliable and safe traversal can be achieved without undue time gaps and inefficiencies for margins of error and exception conditions. The sensors can be used in addition to other intersection control and coordination technologies In other embodiments, in sections of roadways where there is a risk of autonomous or other vehicles incorrectly drifting into an opposing lane, or a wrong lane or going off the road, such as at a steep curve or a road with no median separator, etc., the sensors can be mounted in medians or at the road edge and serve both as a warning and also as a calibration reference. For example, using the precise ranging capabilities, the sensors can continuously measure the distance to the approaching vehicle and use that measured distance to modulate its transmissions. A receiver in an autonomous vehicle can pick up these transmissions and determine the separation to the lane edge and the direction of travel as well as a precise location marker to calibrate its location more precisely than using GPS, gyros, dead reckoning, etc. and use data from any and all these sources. If the vehicle is too close to the lane edge or in otherwise an abnormal or a dangerous situation, the sensor can send suitable alert or warning signals for corrective action or human intervention. Due to the all-weather and fixed nature of these sensors combined with the low cost and long battery operation, they are a useful addition to the mix of technologies needed for these applications. The sensors can use secondary transceivers, including DSRC transceivers, with shared or different antennas and other components in these embodiments. These components can also be used to send traffic data, including predictive or modeled traffic data to the autonomous vehicles and/or to the traffic management systems or intersection controllers.

In one exemplary embodiment, the sensors with one or more zones and one or more additional transceivers for communication, with one more shared or separate antennas or antenna elements, can be housed in a road stud with a battery and/or a solar panel. The sensors can also have other surface mount, subterranean, pole mount or similar configurations.

In other embodiments, the vehicle detection and vehicle identification techniques described here can be used to detect when a mass transit vehicle is approaching an intersection, roadway point, or access point and provide it prioritized access. As the mass transit vehicle is approaching, the sensors can detect the amount of backup at the intersection approach and the intersection controller can change the signals to clear the backup in time for the mass transit vehicle to approach. In addition, knowing precisely the location of the mass transit vehicle at specific spots as it approaches the intersection can help control the intersection timing much more narrowly and reduce the allowance needed for margins of error. The length of backup, the number of vehicles traversing the intersection ahead of the mass transit vehicle, time required to clear, etc., can be utilized by the traffic management system and network to adjust signal timing at subsequent intersections or in the grid in general.

In these configurations, the sensor system is also very useful to warn autonomous and other vehicles of work zones and other temporary road conditions. A sensor sending a warning signal and any associated data can be placed or installed in a portable enclosure near these locations.

These features can make a difference in urban and suburban planning and traffic management. For example, it can be expensive and inefficient to create dedicated bus lanes for a rapid transit system. A system where buses can share the lanes with other vehicles or a selected set of vehicles (such as HOV vehicles) and provide intelligent and prioritized traversal for the buses without unduly sacrificing intersection efficiency can keep all or almost all the benefits of the dedicated bus lanes, while allowing for efficient sharing and use at the same time and makes it economically viable.

In other embodiments, in a larger system, the roadside broad spectrum radar sensors with or without vehicle identification devices can be used in conjunction with on-street parking guidance devices. These guidance devices will provide substantial parking and congestion mitigation benefits and help make cities greener and smarter.

In other embodiments, the sensor can be used to detect trains, vehicles, and/or people at unmanned or automated rail crossings and provide warnings or alerts, especially if a dangerous condition is detected. Battery powered ranging sensors can be located say, around a half or one kilometer from a crossing and an alert sounded at the crossing. Other sensors at the actual crossing can detect is an object such as a person or vehicle is in the crossing. An alert can be sounded when a train in approaching and the same or different alert for the same or different duration can be sounded at the crossing when there is also an object present. As an example, one or two sensors can be used for each train approach. Since trains can arrive in either direction on some tracks, both sides of the crossing for each track can be instrumented. The sensors can communicate to the siren device, which can be collocated with a gateway, through its 802.15.4 or similar ISM band, DSRC, or similar transceiver.

In some embodiments, the radar sensors, whether pole mounted, curb mounted, or subterranean, may communicate information through a gateway or a cellular network to a server using its wireless communication capability. A collection of on-street guidance devices can be networked in a way that they can receive information directly from the on-street sensors or from the server regarding number of vacant spots in a given road segment or block face. A sensor can also be mounted in a raised parking meter dome, particularly at a location above the single space meter so that it has a clear and unobstructed view of the parking space in question. The gateways and/or sensors can contain blacklists for ineligible in-vehicle devices and may use that to disable that device. This capability can also be used for stolen vehicle detection and police can be alerted upon such detection.

The on-street guidance display can show the number of open spaces and have a separate indication when no spaces are open and when data in not available.

For example, the on-street guidance can use a single 7 segment display for each direction of travel using either electromagnetic flip segments (which do not consume any power for the segments unless there is a state change) with highly reflective and visible coatings or can use LED or other suitable electronic-ink or bi-stable LCD displays.

The advantage of using a low power display such as flip dot, flip segment, electronic-ink, bi-stable LCD, etc., is that the display mechanism can be solar or battery powered, which is a benefit for cities where access to continuous power in light poles is cumbersome or expensive or collocating the display units with power involves less desirable tradeoffs.

Figure 8:
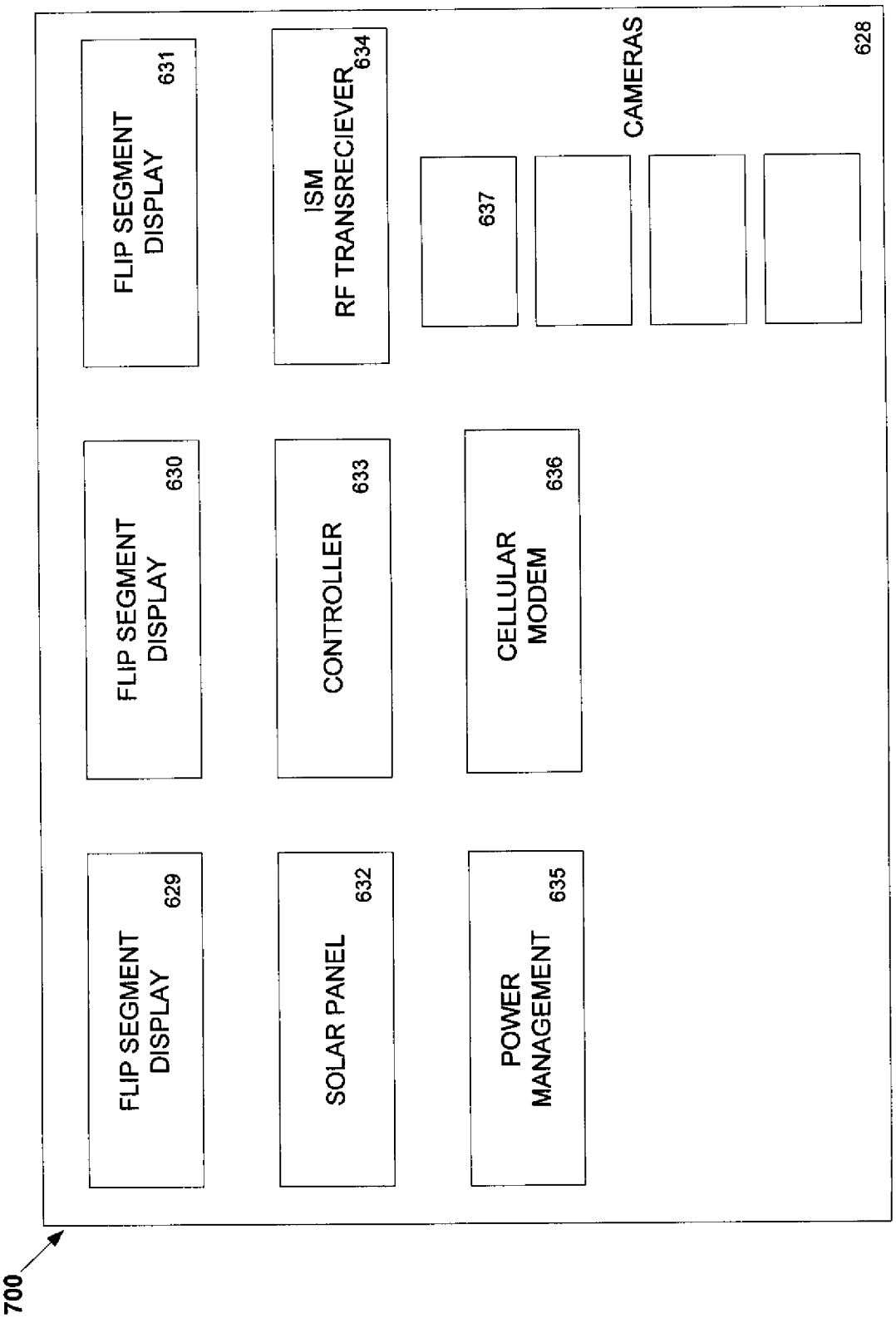
FIG. 8 depicts a schematic block diagram of a collocated roadside unit with gateway, guidance displays (flip segment, e-ink, etc.) and imaging cameras for audit and secondary evidence collection in accordance with an exemplary embodiment.

FIG. 8 depicts an example schematic block diagram 700 of a collocated roadside unit 628 with gateway, guidance displays (flip segment, e-ink, etc.) and imaging cameras for audit and secondary evidence collection. Display units 629, 630, and 631 are used to indicate the space availability in 3 directions of travel for a given intersection approach. Solar panel 632 provides power to the unit combined with batteries for storage and power management unit 635 controls power to various subsystems. Controller 633 uses ISM transceiver 634 and cellular modem 636 to communicate with roadside devices and backend servers respectively. In addition, imaging cameras 637 are interfaced with the controller 633 to enable periodic image evidence to be collected and stored either locally or on the server.

Conveying the parking availability information to motorists can be difficult, given the number of information points. For example, for a given typical roadway approach, the motorist can have a choice of turning left or right or going straight. While the motorist is typically interested in and may make turning decisions based on whether there is sufficient likelihood of having space available, there is usually limited value in knowing how many total spaces, say beyond 9 spaces, are available. For example, if there is 0 or 1 space vacant, one may make a determination that it is unlikely they will find a space as someone else may grab that space by the time the motorist gets there. The situation is different if say there are say, 5 or 8 spaces available and there is a very high likelihood of space being available for the motorist. But there is little value in knowing that there are more than 9 spaces open in a typical on-street parking situation.

To optimize the tradeoffs between conveying too much or too little information, and the size and power requirements, exemplary embodiments use single digit displays for each direction. However, multi-digit displays are envisioned in other embodiments. The displays are collocated in the same enclosure and share the same power and communication mechanism. Often, the display enclosures and control electronics can also serve as gateways for the on-street sensors, but not all display units need to be gateways. The displays can have either ISM band communications or both ISM band and cellular communications in cases where they are configured as gateways.

It is important that the guidance is provided at a point ahead of the intersection to enable motorists make lane change decisions safely and in time. In many embodiments, a multi-direction guidance display is located upstream of each approach that shows open spaces for each possible direction of travel.

The data from the occupancy sensors sent to servers can also be fed to smartphones, GPS units, in-vehicle navigation displays and the like. The on-street guidance display can be used by itself or in conjunction with the in-car or portable devices.

In many applications, there may be sufficient street lighting to keep the flip segment or flip dot or electronic ink or similar non-self-lit displays adequately visible in low light and night conditions. If the guidance displays lose communications with the sensors or the server for any reason, all the segments can be turned off, thus differentiating this condition from when communications are available and no spaces are available.

In some applications, a single direction guidance display can be utilized. The disclosed invention is also applicable for parking lots and garages and displays, typically in multi-digit configurations can be mounted at the entrance of each aisle or floor or section of the parking lot or garage.

Alpha numeric LED display, alternating displays that show the occupancy in different road directions in a time sequence, providing additional digits, etc., are also envisioned in some embodiments.

In many embodiments, the guidance display is integrated with a static parking sign in typical parking colors and fonts.

The solar panel for the display units can be integrated in the same enclosure or be separate for optimal orientation adjustment and be electrically coupled. The display units and solar panel assemblies are design for adequate mechanical strength in high wind conditions and designed to meet transportation department and city specifications for such equipment.

Figure 9:
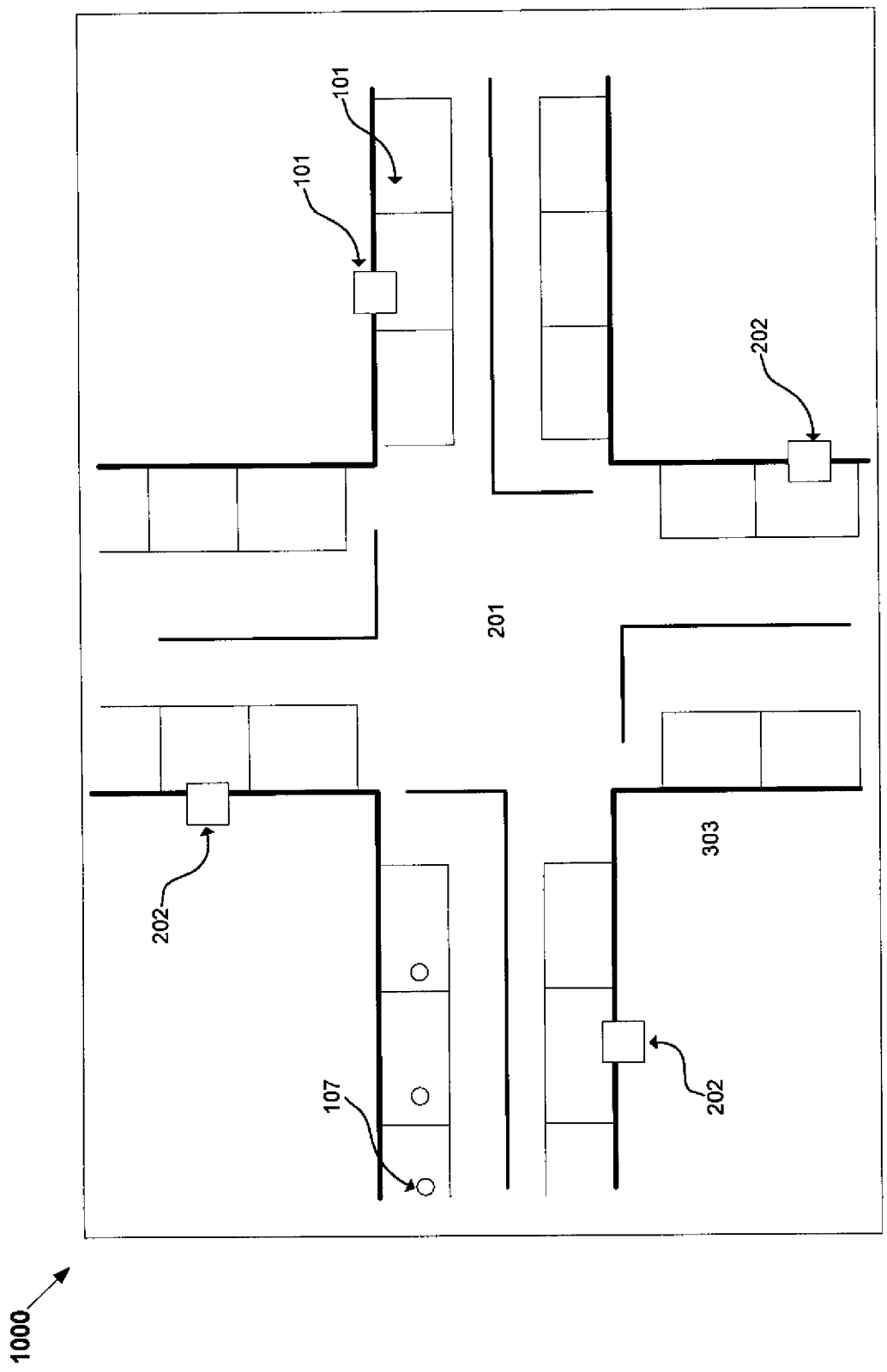
FIG. 9 depicts example placement of guidance displays, optionally collocated with gateways and cameras at each approach to an intersection, such that motorists seeking an open parking space can make informed decisions in accordance with an exemplary embodiment.

FIG. 9 depicts an example placement 1000 of guidance displays collocated with gateways and cameras 202 at each approach to an intersection 201, so that motorists seeking an open parking space can make informed decisions. Subterranean sensor mounting locations 107 are shown along with on-street spaces 101 and curb 303.

The system includes one or more imaging components that may be coupled with the guidance display for secondary evidence related to revenue collections and enforcement. These imagers are directed towards nearby parking spaces, typically ensuring that a given space is covered by at least one imager. In a typical configuration, the imagers are taking an image snapshot, for example, every 30 seconds, and compressing them and either storing locally or sending to a central server. For example, in a metered payment application, it is very desirable for the meters to zero-out time on the meter when a vehicle pulls out or when a new vehicle arrives at the space. While highly accurate sensors, such as those disclosed by the present inventor will prevent false zero-outs, it is often necessary to have secondary evidence if there are errors or disputes. If there is a motorist dispute about a zero-out or a ticket generated due to a zero-out, the images around the time in question can be pulled up by the concerned authority and reviewed for validity. A random check of the images will also work to verify the accuracy and performance of the sensors. The imager may also be triggered when there is vehicle occupancy change detected. An imager can be mounted to see 10-20 or more spaces and is typically collocated with the gateway. Exemplary embodiments may include colocation of gateway, guidance display and one or more imagers to cover all the surrounding spaces. The collocated devices can share power, battery, processor, and communication components. Local storage of the images will reduce communication and long term storage costs, helps mitigate privacy concerns, and can be designed to provide only those images that are necessary for adjudication or secondary review purposes.

Also disclosed is a low power, road side portable surveillance device that uses a low power radar or optical disturbance sensor to detect vehicle presence in a zone of interest, uses that information to wake-up cameras and processing electronics and capture one or more images or video of the vehicles for surveillance or enforcement purposes.

An advantage of the surveillance device configuration according to exemplary embodiments is that it can be small and portable and can be used for security surveillance or for automated photo traffic enforcement purposes.

In a photo enforcement configuration, the surveillance device may be further combined with speed measurement and/or visual signal light detection sensors.

The disclosed embodiments include a solar powered, portable surveillance camera system, that has (i) a low power broad spectrum radar or optical disturbance sensor or similar to detect when a vehicle approaches, (ii) processing electronics and camera with quick wake up capability that can be woken up from power off or low power modes within about 100-200 ms, (iii) rapidly taking one or more images or video stream at a further downstream point from the detected area using an infrared sensitive camera that covers the appropriate lane or set of lanes as the detected vehicle such that the images are optimized to capture the license plate or the back of the vehicle, (iv) optionally taking further scene images in color for context and surrounding information, (v) a near-infrared or infrared flash that is suitable with the image sensor used and triggered synchronously with the camera aperture, (vi) optionally algorithms that recognize whether there is likely a license plate in a given camera image and/or using license plate recognition algorithms to automatically recognize the license plate, (vii) optionally, wirelessly transmitting to a server any of the following: the raw images, compressed images, only the license plate portion of the images, or the license plate text or other output from the recognition software, (viii) encrypting the wireless transmissions as needed, (ix) optionally, storing the data whether images, portion of images, or the license plate text inside the surveillance camera for a defined portion of time, optionally with encryption and/or compression, (x) optionally a GPS receiver, cellular modem or ISM band modems (xi) optionally, vehicle classification algorithms.

In a speed enforcement embodiment of the surveillance camera, an accurate and calibrated speed sensor that meets enforcement standards is electrically coupled with the surveillance camera and maybe collocated in the same enclosure or be electrically coupled from a nearby enclosure. In some embodiments, the surveillance camera can use a single controller board and use buffered or non-buffered switches to switch between image sensors or imager head boards.

Software drivers can run on the controller for each sensor or if the sensors are the same type or similar and configured as such, the same driver can be used with multiple cameras with the application software keeping track of which camera sensor is triggered at what point so that the image is stored in the correct location and marked correctly. A ⅓" or larger format optical sensor is used with a bit clock rate of at least 20 MHz.

In a red light camera enforcement embodiment of the surveillance camera, one or more visual light sensors that are pointed at corresponding traffic lights is electrically coupled with the surveillance camera and maybe collocated in the same enclosure or be electrically coupled from a nearby enclosure. The visual light sensors may have optical filters for red, orange, and green light to determine the state of the traffic signal under all lighting conditions. Appropriate hood and other blocks can be used to prevent interference from sunlight.

In a street sweeper enforcement embodiment, the sensor is mounted typically at the front corners of the vehicle, but also be at the back corners. For each segment of the roadway, the vehicle can be preprogrammed to use either the left or right or both sensors or such action can be taken based on the direction of the vehicle and its GPS, navigation, or dead reckoning coordinates, or be manually controlled by the driver or an operator. If a sensor detects an object, a signal is generated to trigger a camera which will cause one or more images and/or video to be taken. The images and data can be uploaded to a server either in real-time or at the depot and assessed manually or by software processing to detect whether there was an actual violation. Both front facing and rear facing cameras and sensors can be used. This approach provides advantages over traditional LPR based street sweeper solutions, including lower cost, lower processing power, lower complexity and also may result in lower false positives.

In some embodiments, various enforcement applications, such as red light, speed, and stop sign can be simultaneously combined with the surveillance device.

The surveillance camera can have secure connectors accessible only to authorized personnel to connect a laptop and PDA for quick setup and diagnostics in the field. This enables a technician to ensure that the appropriate lanes are being covered by all the sensors, cameras, and light sensors as may apply, and verify the diagnostics and settings, such as speed thresholds, etc., are correctly set.

The surveillance camera can have a secure, quick fit mounting arrangement for mounting on the ground or nearby poles or other fixtures.

In some embodiments, the surveillance camera can have a disturbance and theft sensor that will report disturbance signal and/or current locations using its wireless communication means. The surveillance camera can have day and night modes that are switched based on an ambient light sensor or based on programmable time of day settings. The surveillance camera can be configured to record any combination of still images and video recordings suitable for the application and the cameras are oriented to capture all relevant details of the scene, such as traffic light or adjacent lanes, etc. In many embodiments, the focal length and aperture can be varied either manually or electrically or remotely adjusted in the field to optimize camera views.

The optical field disturbance sensor can be based on one or more linear CMOS or photo cell arrays or similar where the rate of change of light intensity in one or more pixels of the sensors are used to determine whether a vehicle or object is in the field of view. One or more individual photo cells with or without optical filters and lens optics can be used as a disturbance sensor. The determination of the object in the field of view can be based on absolute change in light captured by the photo cell or cells or relative change and timing of change between cells. This will help differentiate between changes due to clouds, sunlight, rain, etc., and natural changes vs. an automobile moving in a specific direction. Direction of travel of the automobile can also be determined using this method.

In some embodiments, infrared, Doppler, or thermal sensors can be used instead of the broad spectrum radar or optical field disturbance sensor. Infrared allowance and/or cutoff filters using manual or electronic switching means can be used selectively for cameras based on day or night modes or whether the image being taken in a license plate image or a scene image. In some embodiments, image sensors with adjustable resolution, binning, and crop are used either in the imager chip or in the processing software to achieve optimal signal to noise, resolutions, and image sizes.

In many embodiments, the GPS location, time, and any other relevant information is overlaid on the photographic images and/or attached as metadata and/or coded suitably and imprinted in select pixels using a security pattern. In many embodiments, the data retained inside the surveillance camera or in the server is encrypted using one-way hashing or other techniques and may be deleted upon some events or a certain period of time passing. In some embodiments, to avoid having large centralized license plate database, the data are stored at each camera for a limited period of time, and the server application can initiate a query to get the relevant data or images, typically upon a manual request. For example, a query can be for license plates with a pattern say, "ABC" or similar or a "pickup truck with green color", etc., or for images with a certain time frame, and the surveillance camera can provide those data to the server. There are many applications for private entities or for local governments and home owners associations. The surveillance camera can also be commanded remotely to erase all its information in some applications.

The surveillance camera can be mounted at parking lot, garage, or driveway entrances and can be used in conjunction with vehicle identification sensors (with or without occupancy detection sensors) as security and/or secondary access control functions. For example, if the vehicle identification sensor has failed for some reason or if the motorist forgets to mount it, the license plate recognized by the surveillance camera can be used to provide access or vice versa.

The surveillance camera, occupancy sensors, and other components can be used with a two-way audio communication system with a remote operator. For example in a remotely operated parking garage, there can be a remote operate alerted as needed to a situation at the entrance of the garage; the remote operator can access the surveillance camera image and vehicle identification data as needed, and use a two way-communication enabled via telephone lines or voice over Internet or similar to communicate with the person at the entrance and assess the situation and take suitable actions. The remote operator can be alerted by the presence or persistence of the person, vehicle or object at the entrance, failure of the vehicle identification device, or under similar circumstances. In some embodiments, the surveillance camera and be tied to wired infrastructure for power and/or data communications.

In some embodiments, one or more surveillance cameras can be mounted on vehicles and can perform vehicle audits, stolen vehicle discovery, parking violation enforcement, and Other embodiments include a meterless parking system for citywide, on-street, or off-street parking in parking lots or garages. The meterless parking system can further combine surveillance cameras with parking space occupancy sensors, payments by phone or SMS or over the Internet, using pre-established accounts, post-pay options, issuing parking notices and fines by mail or similar means, placing registration holds, license or emission check holds, or other available penalties for delinquent patrons, cashless parking, scratch cards or other temporary currency equivalents that can be purchased in local areas, creating hotlists or blacklists of delinquent patrons or frequent violators and disseminating those lists to police, parking and/or other agencies.

In some embodiments, meterless parking can be implemented without the use of parking space occupancy sensors, but that may entail repeated runs of the surveillance camera system and generally are much lower in enforcement efficiency and officer productivity than with sensors. The advantages of broad spectrum radar for highly accurate occupancy and violation detection can be of benefit in meterless parking enforcement. The surveillance camera in this case may be used primarily for taking pictures of suspected violators.

These pictures and/or video can be analyzed in a backend, by an operator, to manually verify a violation and format and issue a notice that can be sent by regular mail, registered mail, or hand delivered to the violator. Such notices can be electronically delivered also. The parking space occupancy sensors can be setup with either marked or unmarked spaces with one or more antennas each. Unmarked spaces can be used in conjunction with a block level marking and signage to help determine the parking rates and restrictions for payment and enforcement purposes.

On-street and off-street enforcement can be combined with a vehicle mounted or handheld surveillance camera.

The surveillance camera can also be mounted on alternative parking enforcement vehicles. The surveillance camera vehicles or operators can be routed to most efficiently capture violations using automated routing algorithms using including but not limited to genetic algorithms, neural network, point-to-multipoint, multipoint-to-multipoint routing algorithms and similar, using both current and future violation predictions based on a probabilistic models, real roadway or line of sight distances, and taking into account real time and/or historical travel times and prediction models of future travel times.

Exemplary embodiments may include the ability to pay within a certain amount of time after the parking period. This may be important in a meterless parking situation where some patrons, for example, such as visitors, may not have preset accounts, payment mechanisms, or registration in a given city, but these patrons may be able to make a payment after the fact within a given time period through any of the payment mechanism such as city designated centers, online portals with the city or a third party service provider, setup an account with a mobile payment service, etc. In this scenario, vehicles may be flagged as violation or potential violations, but no notice is issued for a designated time period, say for example, 10 days, and the patron can up to a week (for example) to make payment, identifying the vehicle using license plate number, time of day, and/or parking space or block number. If payment is made for the vehicle within the predetermined time period, the notice is removed from issuance and no or reduced penalties are applied.

In some embodiments, payment for parking can be made via SMS, mobile wallet providers, or dedicated mobile phone applications. The patron can have linked credit cards, debit cards, or bank account numbers that can be automatically charged per transaction or on a per period basis (for example, monthly), or can be setup as a bill to home option, where a monthly invoice is sent for all charges incurrent in the month along with any service fees if applicable. If payments are not made within given time periods, then violation notices, registration holds, hot listing, and collection activities can be initiated. Payments can also be made via telephone through interactive voice response systems or with human operators at call centers.

The payments can be based on any combination of specific space numbers, block numbers (with license plate or account numbers), simply for a specific amount via a cell phone or account number in which case the vehicle is identified by a license plate number which is linked to the cell phone or account number. It is important that by the time the time threshold for noticing starts, the payment system will consider as valid payment if it can identify that a specific vehicle was paid for according to the parking restrictions for the space it is in. The identification of the specific vehicle can be derived from the space number or pre or post linked license plate number to cell phone or account numbers, etc. In some cases, a cell phone may be linked to more than one vehicle (or vice versa) and if the sequence of payments and violations, or lack thereof, detected in such a way there is ambiguity as to which vehicle was paid for, the city or parking entity can use appropriate business rules such as based on the time sequence of any payments or violations, or simply to give the maximum benefit of doubt to the patron. The city or parking agency may seek to limit the number of such linked vehicles and cell phones. For example, since people typically own at most 2 or 3 vehicles, they can limit the number of cell phones and linked vehicles to 2 or 3, thus limiting opportunities to game the system.

In many cases, the GPS system in the surveillance camera or vehicle may not accurate enough to precisely image the spot automatically and it may be cumbersome to ask the vehicle operator to slow down and manually assist in imaging the space. In these cases, the surveillance camera may be configured to take pictures and/or video of a range of spaces near the violating vehicle such that there is a high likelihood that the violating space is captured and the images and/or video can be post-processed manually or automatically to find the violating vehicle and the remainder of the images can be discarded.

In some embodiments, the enforcement vehicle can be equipped with more than one surveillance camera to image both sides of the road.

The meterless parking methods can be implemented with any combination of guidance displays, payment mechanisms, sensors, surveillance cameras, and optionally two-way voice communication can be used by private parking space owners such as individual owners, apartment complexes, or office parking space owners to rent unused parking spaces that they own on a highly flexible schedule basis. For example, there may be one or more parking spaces near a busy commercial center or a sports arena, in a downtown area, or anywhere where there is parking demand and the spaces will go unused at a certain time. A web based system where the owners or space operators can enter the space available times can be used to advertise the space vacancy using the guidance displays that may have alternate configurations for this application and may be of alpha numeric type. The parking space sensor can be used to detect when a vehicle parks at the space and there will be static or dynamic signage via the guidance display or an alternate display regarding payment instructions and rates. The payments can be made via the Internet using a credit card, by telephone or SMS using pre-linked accounts or fresh accounts created, by an interactive voice response application, talking to human operator at a call center, or any combination of these. The surveillance camera can optionally be used for security and audit purposes. The maximum length of stay, etc., are communicated to the motorist and implied and explicit contractual terms including towing beyond the maximum limits are communicated. If there is an overstay or a non-payment situation, a tow operator can be immediately alerted. In some cases, a grace period may be allowed. In some cases, the tow operator may be alerted to a potential tow situation before the expiry of the maximum stay period or the grace period since it may be critical in a lot of cases, that the space is freed up for the owners in a short amount of time.

This method and its variants may open up additional unused parking capacity in congested areas, provide additional revenues to parking space owners and help ease parking shortages in critical areas. The availability of parking spaces can be advertised via the Internet and reservations can be made against them, typically by prepaying. The reserved spaces will be removed from the guidance signage showing vacant spaces and if a non-authorized parker parks at a reserved space, he is alerted via display signage and perhaps even the two-way voice communication link with a remote operator. The tow company may be automatically or manually alerted. To ensure that the reservation holder is at the spot, the reservation holder can be given a code or can send an SMS once they have arrived, or the system can automatically send them an SMS or voice call and they respond back or indicate it is they who have parked in the space. Alternatively, or in addition, a remote operator may simply verify the license plate or the car type by viewing the surveillance camera image. A combination of these verification means maybe used to ensure that the reservation holder has arrived. The system may further send reminder texts or voice prompts to the reservation holder reminding them of the reservation, directions, maximum length of stay or any other pertinent information. The system may be used in conjunction with city or private enforcement personnel to replace or augment the surveillance camera functions. The occupancy sensors for this application can use ultrasonic, infrared, broad spectrum radar, FMCW or other narrow spectrum radar, laser ranging, magnetic, or other techniques.

Another component of exemplary embodiments is an electronic wireless vehicle clamp device. The low power ISM band modems disclosed in the sensors, gateways, and guidance components of exemplary embodiments described above can also be used in an electronic boot device that contains its own battery to unlock wirelessly. The wireless capabilities of the boot can be used to send status and self-diagnostics, as well as track the boot for asset management and other purposes. In addition, the boot or clamp device can contain GPS sensors and theft prevention features, including a cellular modem that is woken up only when ISM band devices are not available, which can be used to report potential unauthorized movement of the clamp. In most situations, the clamp is placed on parked vehicles in enforced parking locations. These locations are likely to have compatible RF transceivers in meters, sensors, gateways, and guidance displays. The clamp wakes up to query the gateway or other device, say every 10 seconds to see if a communication is pending for it. It can receive communications that can be encrypted using symmetric and asymmetric key ciphers, unlock the device and report the status to the server through the gateway. Instruction to make payments and unlock can also be displayed or printed at a parking meter or available on a website that is labeled on the clamp.

Figure 10:
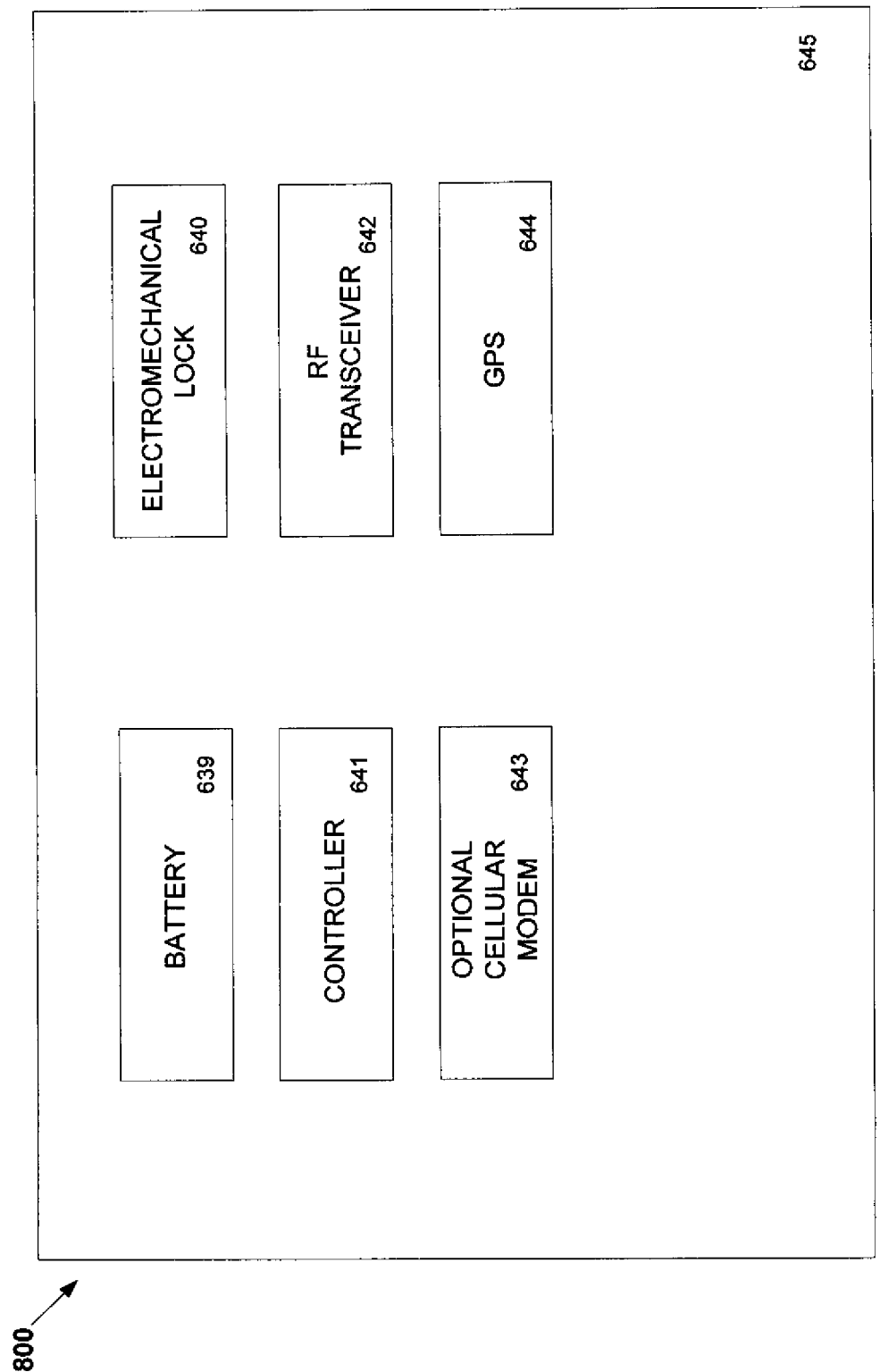
FIG. 10 depicts a schematic block diagram of a wireless boot control and management device in accordance with an exemplary embodiment.

FIG. 10 depicts an example schematic block diagram 800 of a wireless boot control and management device 633. The electromechanical lock 640 serves to operate the boot lock and is powered by battery 639 and is controlled by controller 641, which uses RF transceiver 642 to communicate. GPS 644 is used by the controller for asset location and theft detection purposes and the optional cellular modem 643 is used when the boot 633 is out of range of an ISM network.

The embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A parking management system, comprising:
   a roadside unit comprising a vehicle occupancy sensor with a zone of detection that corresponds to a parking space being monitored, and
   a first radio frequency (RF) transceiver comprising a first antenna that radiates towards the parking space to communicate with an in-vehicle transceiver and
   a second antenna that radiates in a direction to communicate via one or more nearby gateways or cellular towers; and
   an in-vehicle device comprising a second RF transceiver that is configured to communicate with the roadside unit, the in-vehicle device further comprising a self-contained battery source and a unique identifier;
   wherein parking management for one or more parking events utilizes a protocol that establishes two-way communication between the roadside unit and the in-vehicle device, and
   includes a time delay element that determines a distance between the roadside unit and the in-vehicle device based on a fixed or known time delay and includes at least one selected from the group of:
   one or more beacon setting requirements, information needed for identification, information needed for authentication or security purposes, or any combination thereof.

2. The system of claim 1, wherein at least one parking event linked to a specific in-vehicle device identifier in the parking space or zone is associated with collecting parking fees linked to the unique identifier or enforcing parking rights and violations without user input.

3. The system of claim 1, further comprising:
   an imaging camera system with at least one imaging sensor configured to collect, at one or more pre-determined interval, secondary evidence relating to one or more image snapshots of at least the parking space,
the imaging camera system further configured to compress the one or more image snapshots and store the compressed one or more image snapshots, the imaging camera system being shared across a plurality of parking spaces; and
a guidance display indicating a number of parking spaces available in a given zone or direction of travel.

4. The system of claim 1, wherein the in-vehicle device provides at least one of a visual and auditory indication that signals one or more of communications and range information with the roadside unit, wherein the roadside unit is configured to synchronize the in-vehicle device via one or more marker pulses.

5. The system of claim 1, wherein the roadside unit is mounted: on a pole, coupled with a parking meter, at or under the road surface in a subterranean configuration, or on a curb.

6. The system of claim 1, wherein the roadside unit is mounted near a mutual border of two adjoining parking spaces and a plurality of sensing antenna elements and a plurality of RF transceiver antenna elements are coupled to a shared battery, power management, and controller.

7. The system of claim 1, wherein the roadside unit is electrically or mechanically coupled with a parking meter in order to communicate with the parking meter for reporting one of occupancy status, telemetry, and zero-out conditions.

8. The system of claim 1, wherein the first and second RF transceivers of the roadside unit and the in-vehicle device have two-way communications and one or more encryption schemes.

9. The system of claim 1, wherein one more distance measurements are obtained between the in-vehicle device and a plurality of the roadside units.

10. The system of claim 1, wherein at least one of the in-vehicle device and the roadside unit includes passive delay elements or active delay elements, designed to retransmit the roadside unit's signals after a specified delay.

11. The system of claim 3, wherein the guidance display is solar powered and includes one of a flip segment display, e-ink display, LED, or bistable LCD.

12. The system of claim 3, wherein the guidance display is co-located with a gateway device.

13. The system of claim 3, wherein the imaging system is associated with the secondary evidence when adjudicating a violation.

14. The system of claim 1, wherein the parking space is paid for using a vehicle plate number or a parking space number even after at least one parking event has completed and prior to a violation being registered.

15. The system of claim 1, wherein the parking space is paid for or validated using one of SMS, mobile wallet, existing parking rights or privileges, dedicated mobile applications, interactive voice response system, automated voice response system, post pay, or by invoicing after at least one parking event is completed.

16. The system of claim 1, wherein the parking space can be reserved prior to arrival using an application comprising instructions for execution on a mobile device or an automated or intelligent voice response system.

17. The system of claim 3, wherein the guidance display or auditory indication is part of a portable electronic device.

18. The system of claim 17, wherein the guidance display is configured to display a parking occupancy indication in at least one direction of travel.

19. The system of claim 1, wherein the in-vehicle device is implemented as an application comprising instructions for execution on a mobile device or is incorporated into an in-vehicle computing device and wherein further the in-vehicle device communicates to a central server instead of the roadside unit.

20. The system of claim 3, wherein the occupancy sensor is implemented as an algorithm in conjunction with the imaging sensor.

21. The system of claim 1, wherein at least one of a change of occupancy state detected by the vehicle occupancy sensor and a change in motion information detected by the in-vehicle device is used to initiate a communication between the roadside unit and in-vehicle device.

22. The system of claim 16, wherein the system comprises validating via the application for user confirmation or with the in-vehicle device whether a reserved user has parked in the space and exception handling or enforcement mechanism in case of an unauthorized user parking.

23. The system of claim 22, further comprising at least one of a visual display or indicator and an audio display, or indicator, in the roadside unit to indicate a reservations status of the parking space and to provide feedback to an operator of the vehicle.

24. The system of claim 3, wherein the one or more image snapshots are reviewed for at least one of: accuracy and performance of the vehicle occupancy sensor, and one or more errors or disputes.

25. The system of claim 3, wherein a change of occupancy state detected by the vehicle occupancy sensor is configured to trigger the imaging camera system.

26. A parking apparatus, comprising:
a roadside unit comprising a vehicle occupancy sensor with a zone of detection that corresponds to a parking space being monitored, and
a first radio frequency (RF) transceiver comprising a first antenna that radiates towards the parking space to communicate with an in-vehicle transceiver and
a second antenna that radiates in a direction to communicate via one or more nearby gateways or cellular towers; and
an in-vehicle device comprising a second RF transceiver that is configured to communicate with the roadside unit,
the in-vehicle device further comprising a self-contained battery source and a unique identifier;
wherein a protocol establishes two-way communication between the roadside unit and the in-vehicle device, and includes
a time delay element that determines a distance between the roadside unit and the in-vehicle device based on a fixed or known time delay and includes at least one selected from the group of:
one or more beacon setting requirements, information needed for identification, information needed for authentication or security purposes, or any combination thereof.

* * * * *